Figure 1:
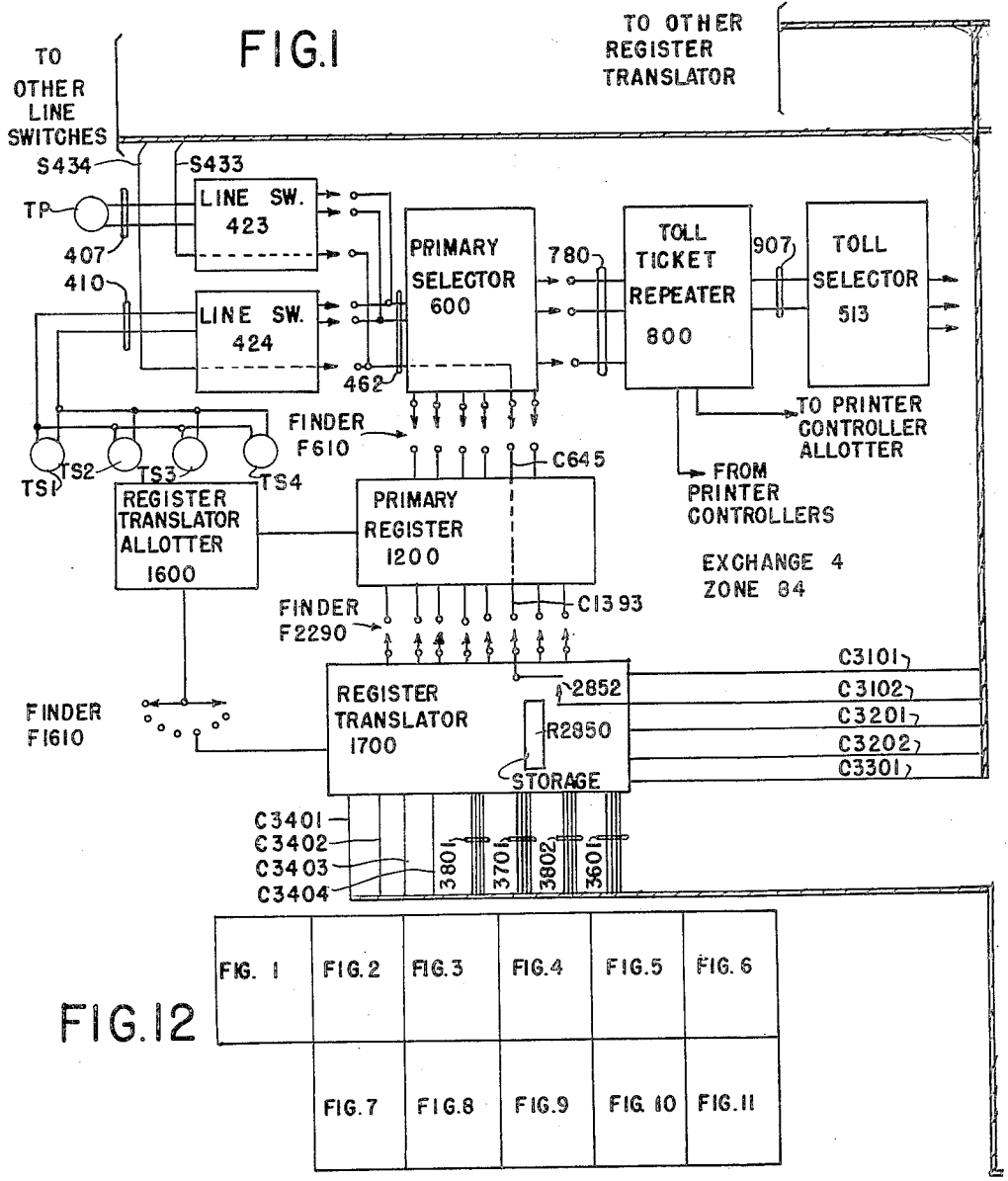
Figure 2:
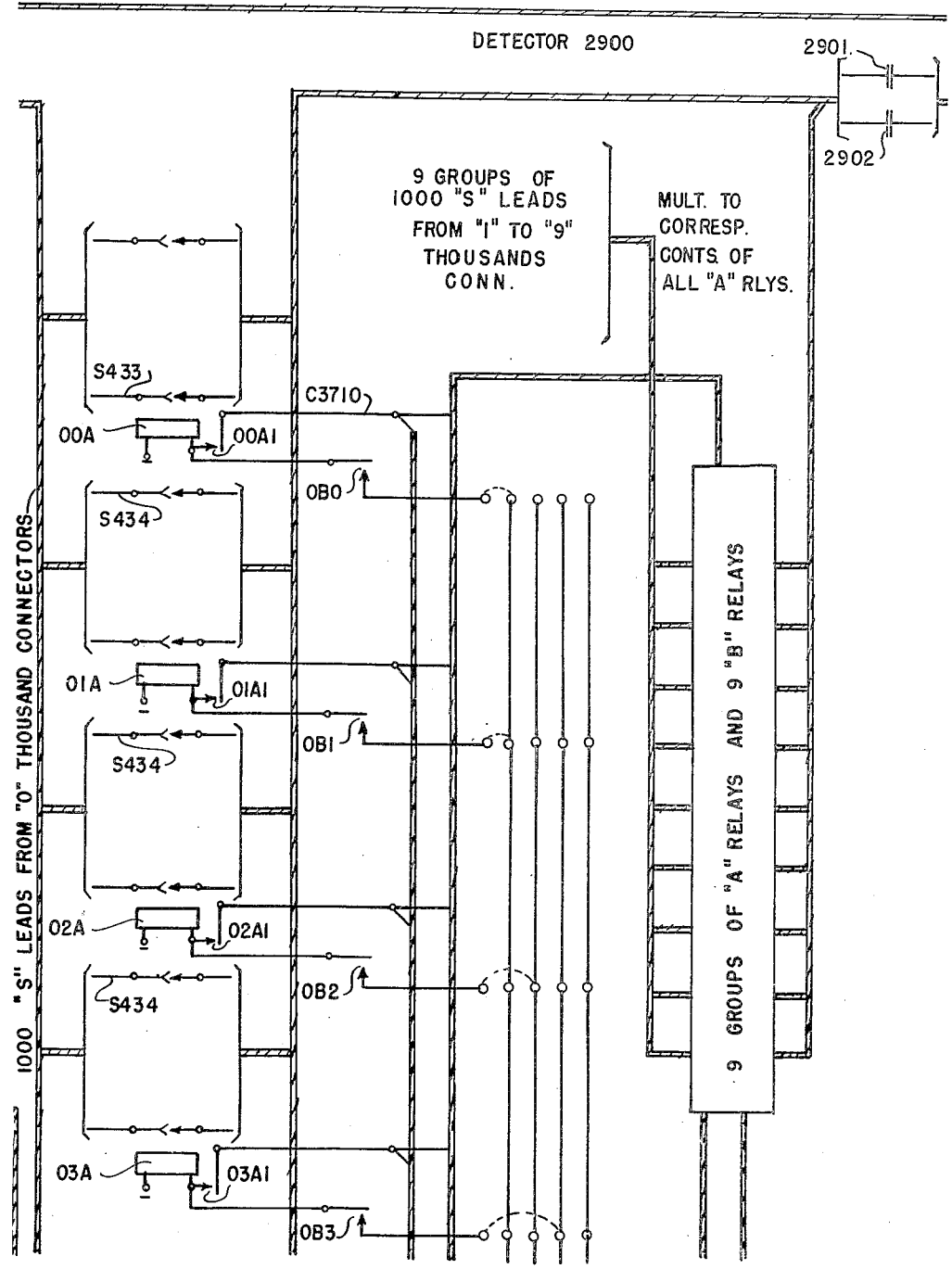
Figure 3:
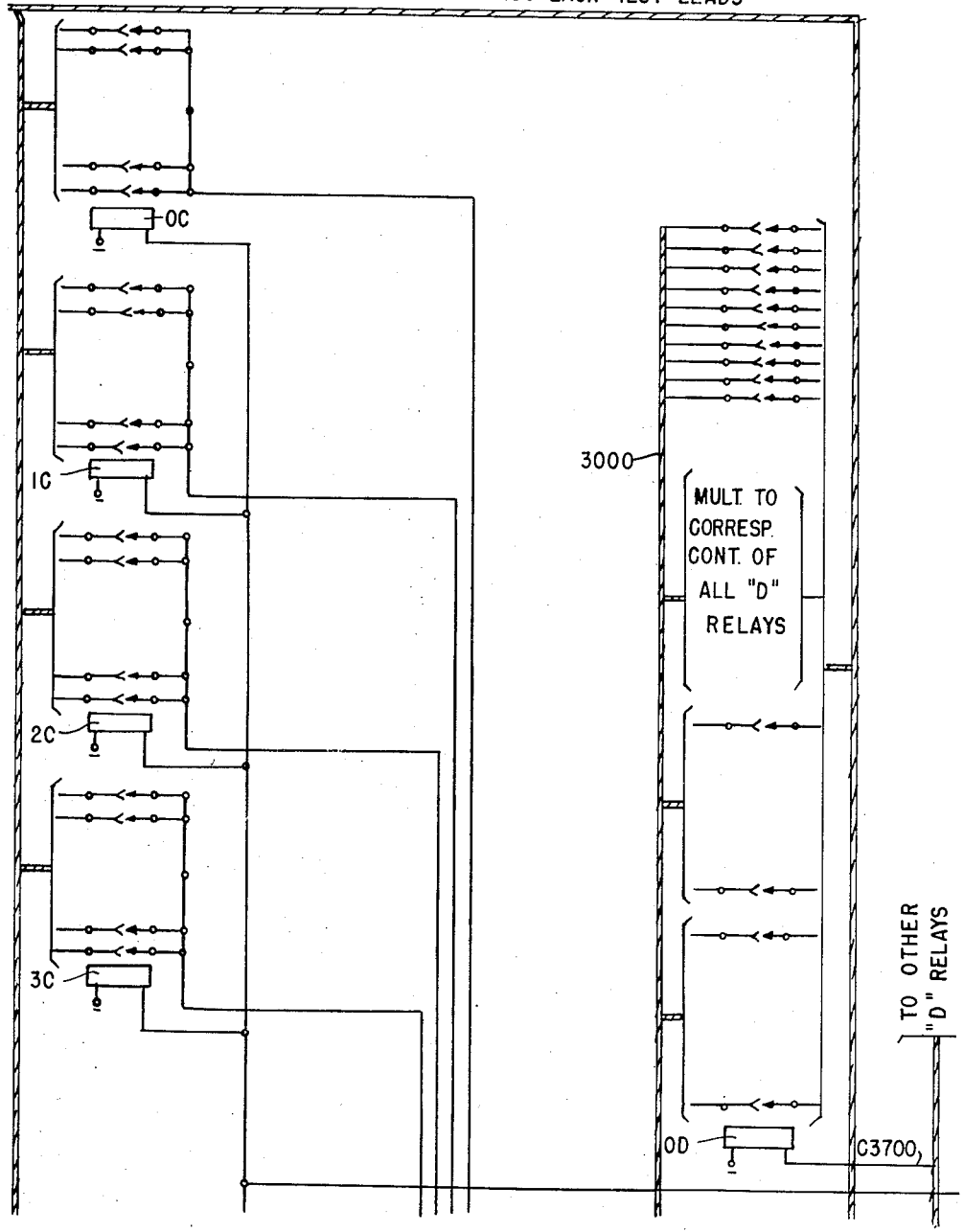

Oct. 30, 1945. O. D. GRANDSTAFF 2,387,897
LINE DETECTING APPARATUS
Filed Dec. 21, 1942 11 Sheets-Sheet 7

INVENTOR.
OTHO D. GRANDSTAFF
BY Davis, Lindsey, Smith & Shorts
ATTORNEYS

Oct. 30, 1945.   O. D. GRANDSTAFF   2,387,897
LINE DETECTING APPARATUS
Filed Dec. 21, 1942   11 Sheets-Sheet 8

INVENTOR.
OTHO D. GRANDSTAFF
BY Davis, Lindsey, Smith & Shonts
ATTORNEYS

Patented Oct. 30, 1945

2,387,897

UNITED STATES PATENT OFFICE 2,387,897

LINE DETECTING APPARATUS

Otho D. Grandstaff, Oak Park, Ill., assignor to Automatic Electric Laboratories, Inc., a corporation of Delaware Application December 21, 1942, Serial No. 469,641

15 Claims. (Cl. 179—27)

The present invention relates to telephone systems and more particularly to line detecting apparatus. More specifically, the present invention relates to line detecting apparatus adapted to be incorporated in an automatic recording telephone system of the character of that disclosed in the copending application of John E. Ostline, Serial No. 453,799, filed August 6, 1942.

In an automatic recording telephone system, such, for example, as that disclosed in Ostline Patent No. 2,297,365, granted September 29, 1942, a line detector is provided which usually includes an electron discharge device which is utilized to detect the directory number of the calling subscriber line, upon which has been initiated a metropolitan toll call requiring the recording of certain items of record information in conjunction therewith.

While the line detector incorporated in this system is entirely satisfactory in operation under ordinary operating conditions, it is susceptible of false operation in the event a surge or other extraneous voltage should appear upon a non-calling line connected thereto during the brief time interval the detection is being made upon the last-mentioned line.

Accordingly, it is an object of the present invention to provide in a telephone system of the type noted an improved line detector which is responsive to the testing of a line having a predetermined signal voltage impressed thereupon and which is non-responsive to surge and other extraneous voltages appearing upon the line.

Another object of the invention is to provide a detector which comprises an improved arrangement for comparing a found signal voltage with an applied reference voltage, whereby a detection is performed only in the event a fixed relation exists between the voltages mentioned.

A further object of the invention is to provide a detector which comprises an improved arrangement for matching a found alternating signal voltage with an applied alternating reference voltage, whereby a detection is performed only in the event the frequency and phase of the signal voltage closely matches the frequency and phase of the reference voltage.

A further object of the invention is to provide a detector comprising an improved electron discharge device for matching a found signal voltage with an applied reference voltage.

Further features of the invention pertain to the particular arrangement of the circuit elements of the system, whereby the above-outlined and additional operating features are attained.

The invention, both as to its organization and method of operation, together with further objects and advantages thereof, will best be understood by reference to the following specification taken in connection with the accompanying drawings, in which Figures 1 to 11, inclusive, illustrate the apparatus incorporated in exchange 4 zone 84 of the telephone system, which apparatus has incorporated therein the features of the invention as briefly outlined above; and Fig. 12 illustrates the mode of combining Figs. 1 to 11, inclusive, to form a unified system. More particularly, Fig. 1 illustrates schematically a major portion of the apparatus incorporated in exchange 4 zone 84; while Figs. 2 to 11, inclusive, illustrate the details of the detector provided in exchange 4 zone 84.

*The general arrangement of the telephone system*

As disclosed in the previously mentioned copending Ostline application Serial No. 453,799, filed August 6, 1942, the automatic telephone system serves a large metropolitan area and the adjacent suburban areas which are divided into a number of subareas or zones, each of which includes one or more exchanges. More specifically, the area served by the telephone system comprises, among other zones, the zone 84 which zone includes, among other exchanges, the exchange 4. Each exchange in each zone comprises a 10,000 terminal unit; although it may not be initially installed to serve its ultimate terminal capacity. The lines terminating at each exchange in each zone comprise both private subscriber lines and party subscriber lines. The party subscriber lines are arranged on a terminal-per-substation basis, thereby reducing the actual number of lines terminating at each exchange.

The various exchanges in each zone are interconnected by suitable groups of trunk lines, not shown; while at least one such exchange is interconnected with at least certain of the exchanges in other zones by suitable groups of toll lines, not shown.

In the automatic telephone system, the various local, trunk and toll calls are set up by automatic switching apparatus under the control of the subscriber substation equipment, including the usual calling device or dial. In order to facilitate the setting up of various connections, a numbering scheme is utilized in the automatic telephone system, whereby all called subscriber substations in the various exchanges in the various zones are dialed as listed in the directory. Accordingly, the directory number of each subscriber substation in the telephone system comprises a code portion and a numerical portion. More particularly, the directory number of each subscriber substation in zone 84 comprises a code portion, including the three digits 8, 4 and 4, identifying the zone 84 and the exchange 4, and a numerical portion, including four digits, identifying the terminal of the station. At this point it is noted that the directory numbers of the party subscriber substations require no suffix digit in view of the fact that all of the subscriber lines are arranged on a terminal-per-substation basis, as previously noted.

*The apparatus incorporated in exchange 4 zone 84 of the telephone system*

Preferably, each exchange in the telephone system comprises apparatus substantially identical to that provided in exchange 4 zone 84, which apparatus includes, as shown in Figs. 1 to 11, inclusive, automatic switching equipment serving a maximum of 10,000 terminals, one of the terminals terminating the private subscriber line 407 and four of the terminals commonly terminating the party subscriber line 410. The switching equipment comprises a number of line switches individually associated with the subscriber lines terminating at exchange 4 zone 84, the line switches 423 and 424 being respectively associated with the private subscriber line 407 and the party subscriber line 410. At this point it is noted that the private subscriber line 407 has a private subscriber substation TP connected thereto which is rendered private subscriber substation service; while the party subscriber line 410 has four party subscriber substations TS1, TS2, TS3 and TS4 connected thereto which are rendered party subscriber substation service. More particularly, the private subscriber substations TP etc. and the party subscriber substations TS1, TS2, TS3, TS4 etc. are rendered free automatic local service, automatic toll service to exchanges in the various zones in the metropolitan area for which charges are made on a monetary basis, as well as long distance toll service via a manual toll operator position, not shown.

Also the switching equipment comprises a group of primary selectors, including the primary selector 600, which is accessible to the various line switches 423, 424 etc. Each primary selector is provided with an individually associated finder having access to a group of primary registers, the finder F610 being individually associated with the primary selector 600.

Further, exchange 4 zone 84 is provided with a group of primary registers, including the primary register 1200, which is accessible to the various finders individually associated with the primary selectors, a group of register translators, including the register translator 1700, and a register translator allotter 1600. The register translator allotter 1600 comprises a finder F1610 having access to the group of register translators; and each register translator comprises a finder having access to the group of primary registers, the register translator 1700 comprising the finder F2290 having access to the group of primary registers. At this point it is noted that the group of primary registers is larger than the group of register translators in order to effect a saving in equipment, in view of the fact that the connection and arrangement of a primary register is much more simplified than the relatively complex connection and arrangement of a register translator.

Also exchange 4 zone 84 is provided with a local switch train, not shown, a switchboard, not shown, and toll ticketing apparatus. The toll ticketing apparatus comprises, in addition to the number of register translators including the register translator 1700, a number of groups of toll ticket repeaters, one of the groups including the toll ticket repeater 800, a detector 2900, a number of printer controllers, not shown, a printer controller allotter, not shown, a date and time unit, not shown, a printer link, not shown, a toll ticket printer, not shown, and a record printer, not shown. Also exchange 4 zone 84 comprises a number of groups of toll selectors individually associated with the various groups of toll ticket repeaters, the toll selector 513 being individually associated with the toll ticket repeater 800.

In exchange 4 zone 84, the various primary selectors have access to the toll ticket repeaters and to the local switch train, while the toll selectors have access to the various toll lines extending to the exchanges in other zones. Further it is noted that the detector 2900 has access to each subscriber line terminating at exchange 4 zone 84 and is commonly associated with the various register translators in exchange 4 zone 84. Each subscriber substation in exchange 4 zone 84 is provided with substation apparatus including a telephone instrument, a ringer and a calling device or dial. The calling devices disposed at the private subscriber substations and at the first party subscriber substations are of conventional construction and arrangement; while the calling devices disposed at the second, third and fourth party subscriber substations are of the special construction and arrangement of that disclosed in the copending application of John E. Ostline, Serial No. 404,103, filed July 26, 1941. More particularly, the calling device disposed at each second, third and fourth party subscriber substation comprises, in addition to a set of impulse springs, a set of cam springs which is utilized to identify the position of the calling party subscriber substation on the associated party subscriber line, in a manner more fully explained hereinafter.

Figure 6:
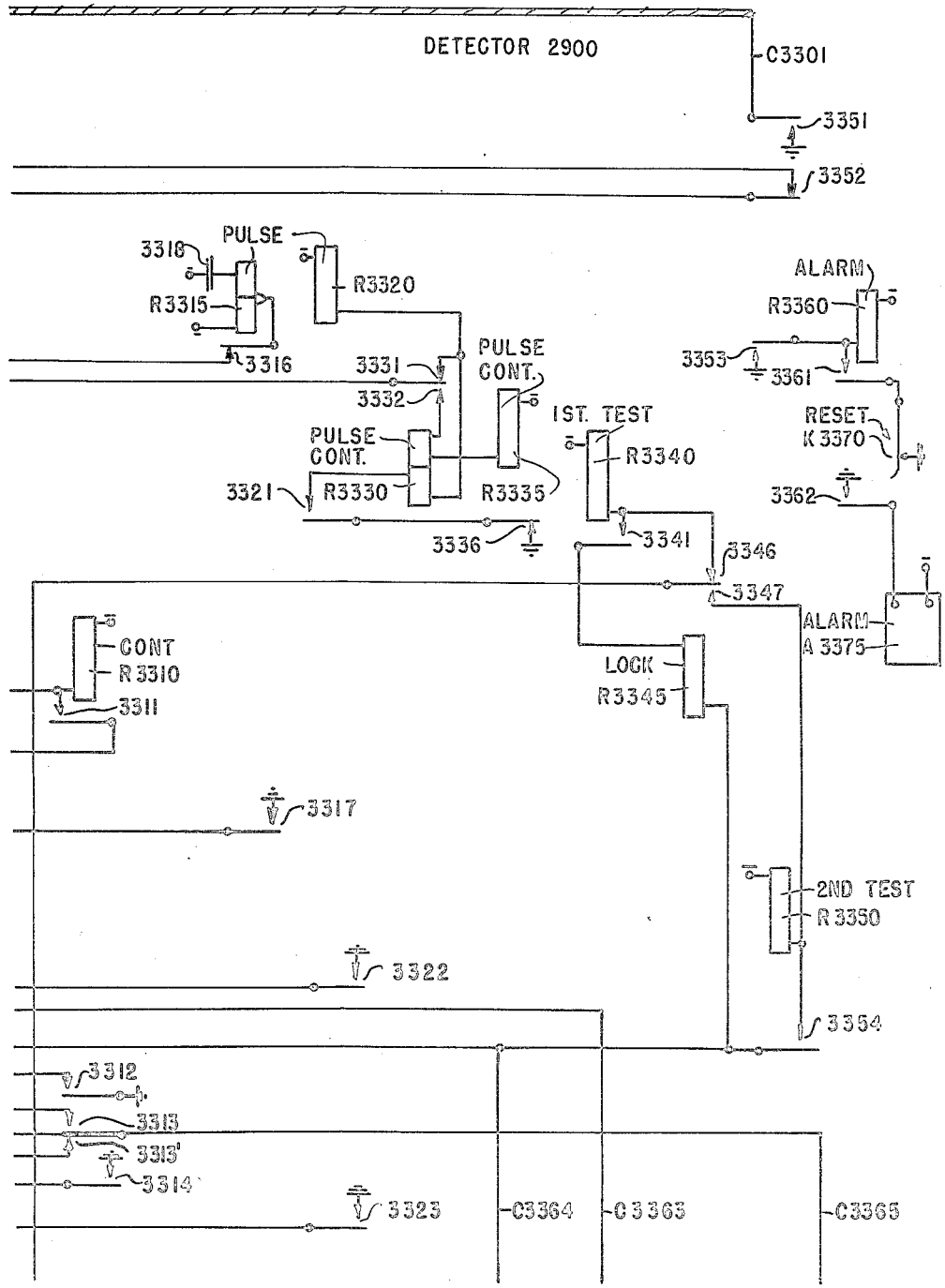
Figure 7:
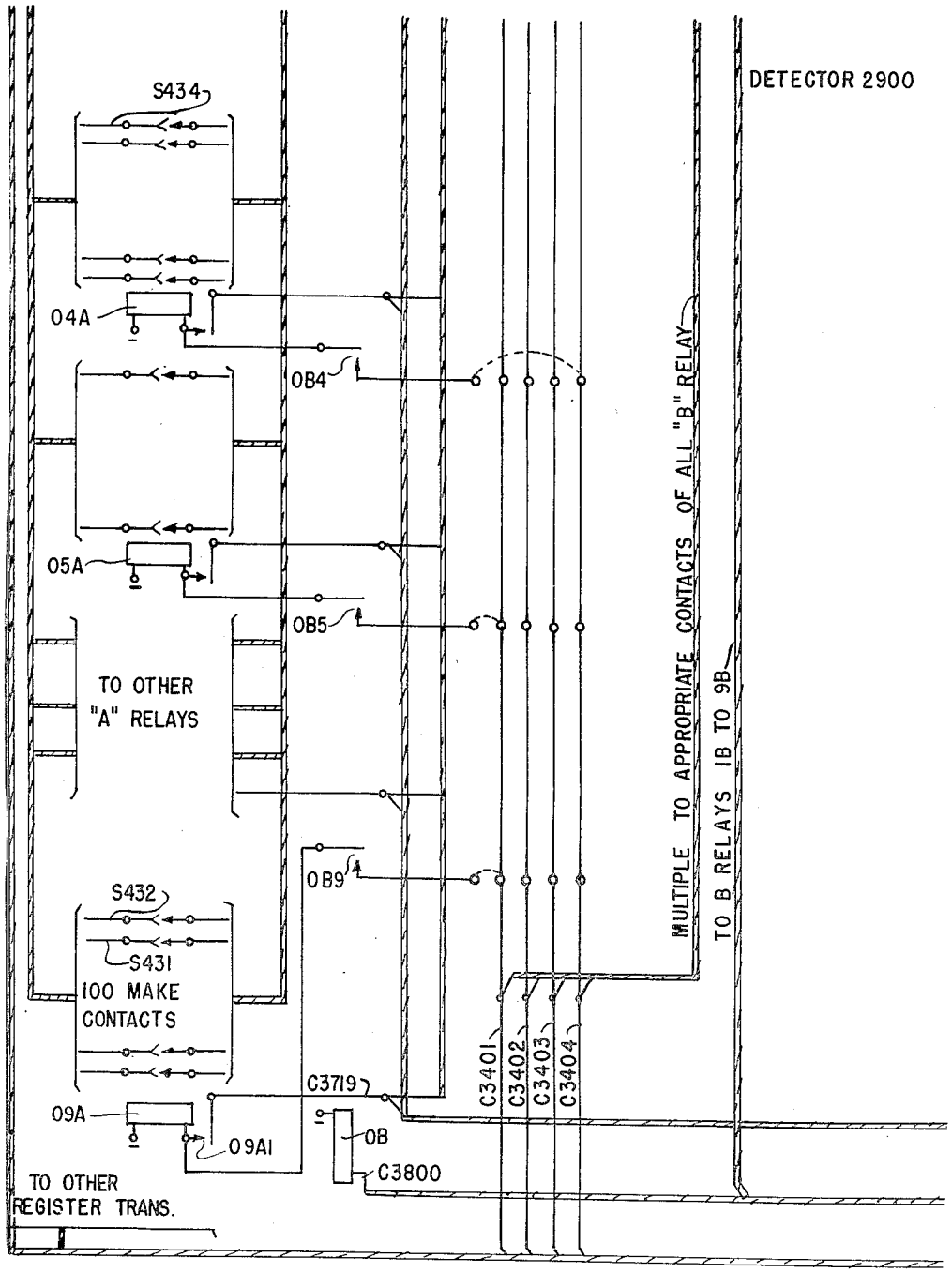
Figure 8:
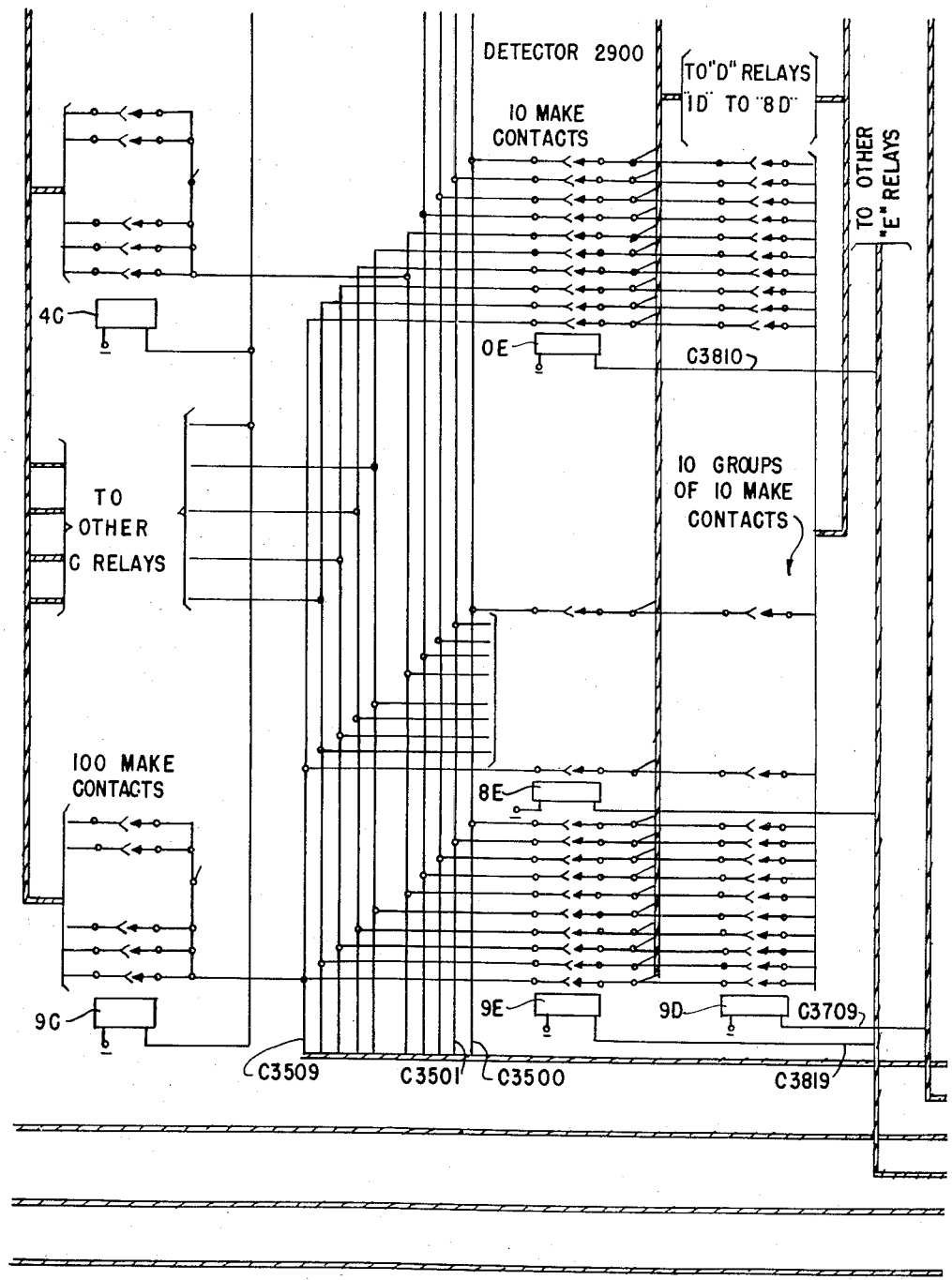
Figure 9:
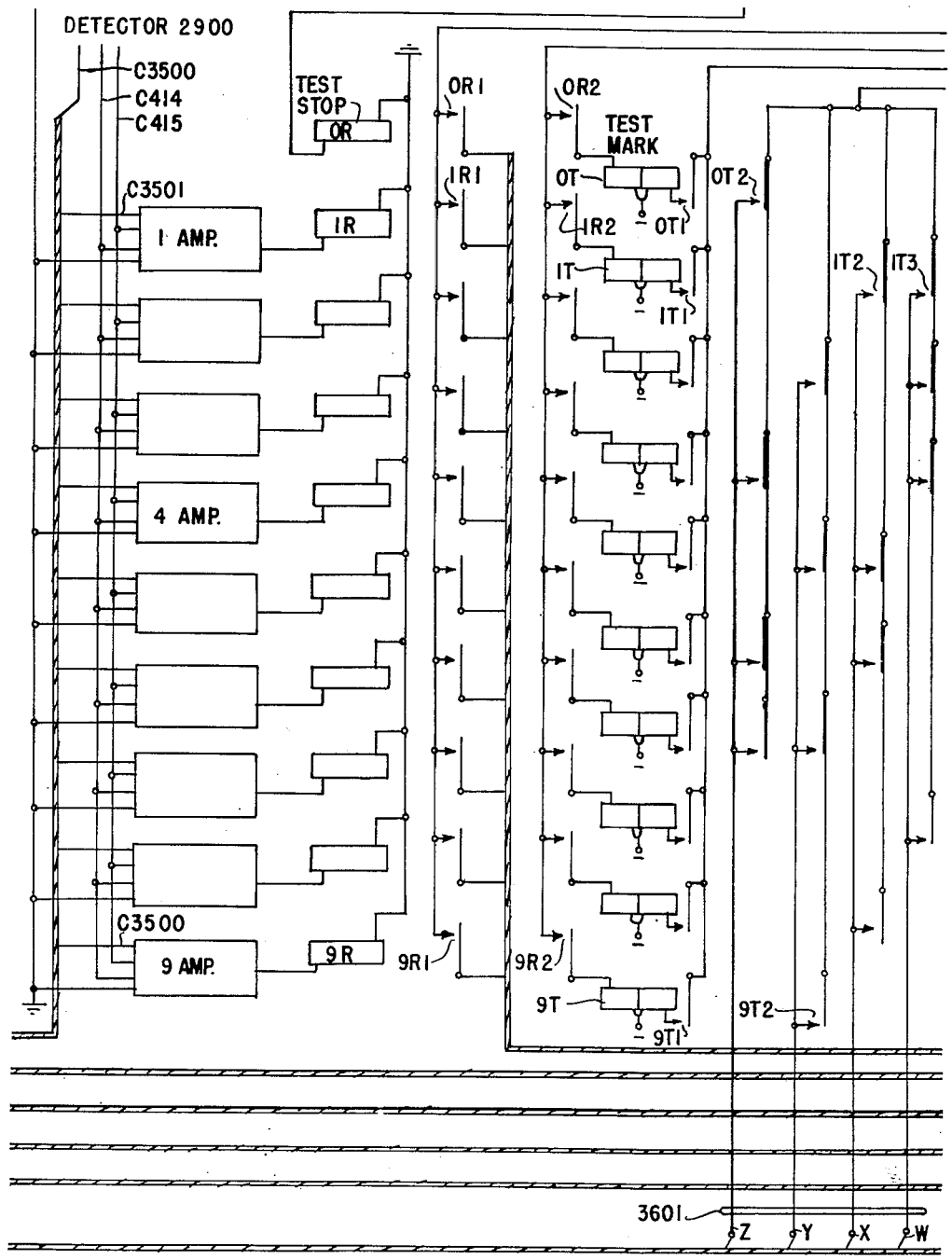
Figure 10:
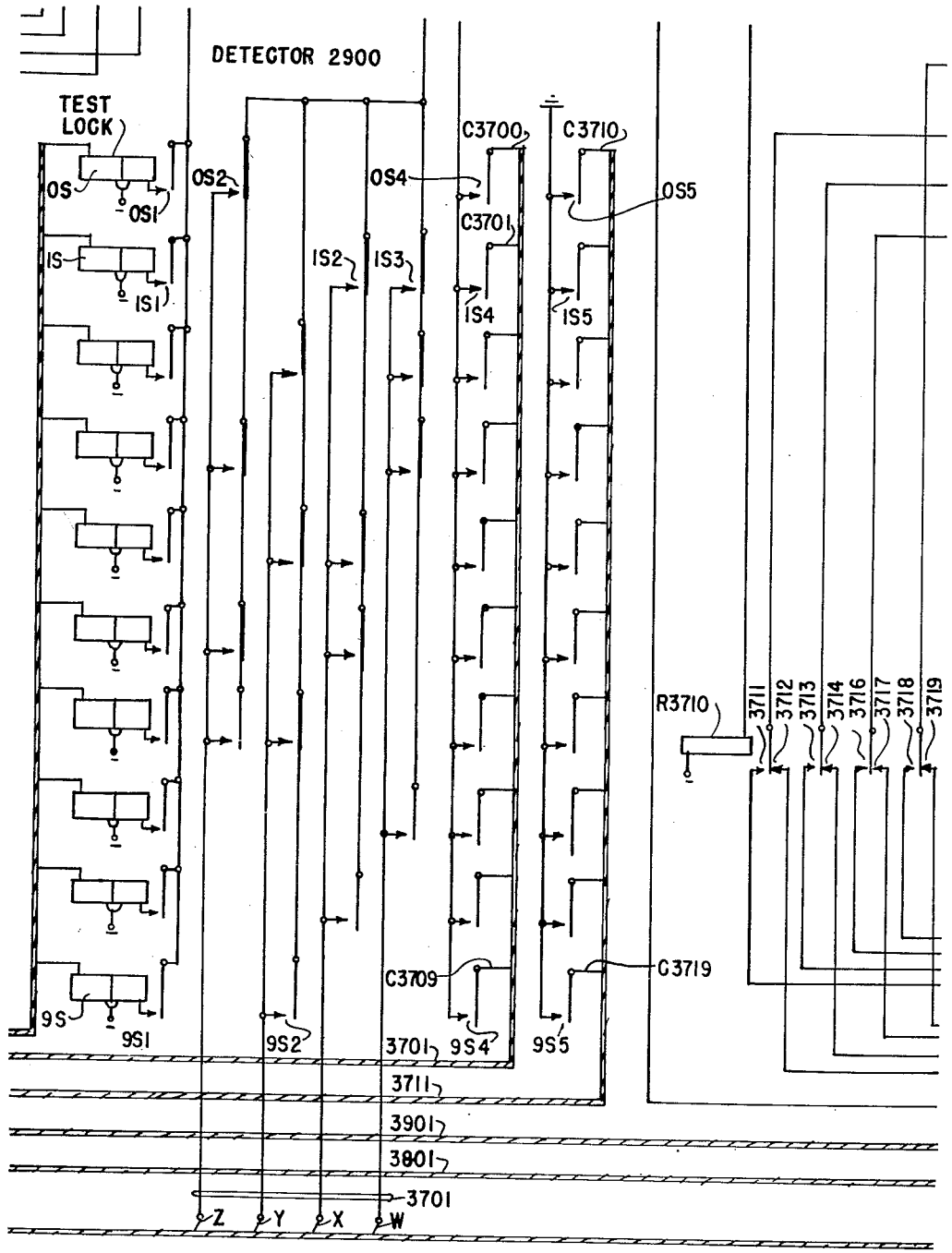
Figure 11:
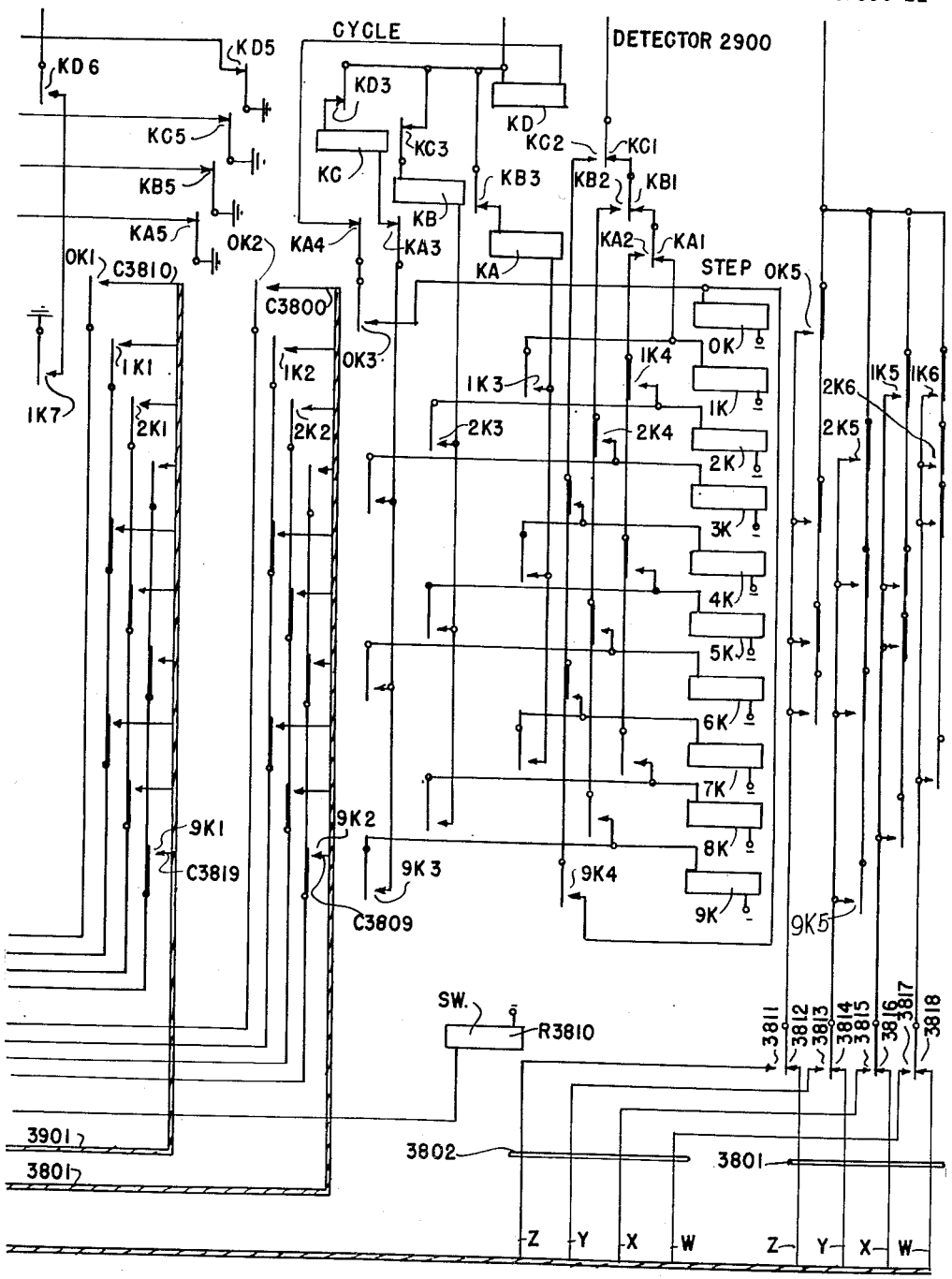

Preferably, in exchange 4 zone 84, the line switches 423, 424 etc. and the toll selectors 513 etc., diagrammatically illustrated in Fig. 1, are of conventional construction and arrangement; while the primary selectors 600 etc., the toll ticket repeaters 800 etc., the primary registers 1200 etc., the register translators 1700 etc. and the register translator allotter 1600, diagrammatically illustrated in Fig. 1, are of the construction and arrangement of the corresponding elements disclosed in the previously mentioned copending application of John E. Ostline, Serial No. 453,799, filed August 6, 1942. More specifically, in the Ostline application mentioned above, the primary selector 600 is illustrated in Figs. 6 and 7 thereof; the toll ticket repeater 800 is illustrated in Figs. 8 to 11, inclusive, thereof; the primary register 1200 is illustrated in Figs. 12 to 16, inclusive, thereof; the register translator 1700 is illustrated in Figs. 17 to 28, inclusive, thereof; and the register translator allotter 1600 is illustrated in Fig. 16 thereof.

The detector 2900 included in exchange 4 zone 84 has access to 10,000 terminals and comprises, as shown in Figs. 2 to 11, inclusive, ten groups of A relays, each group of A relays including ten individual A relays. The tenth group of A relays mentioned is illustrated and comprises the individual A relays 00A to 09A, inclusive, and is associated with the 1,000 S leads from the 0 thousand connectors. Each A relay comprises 100 make contacts, whereby a given A relay in the tenth group is operative to connect the corresponding 100 S leads in the 0 thousand group to the detector 2900 for test purposes.

At this point it is noted that the S lead S433 extends to the line switch 423 individually associated with the private subscriber line 407 and is accessible to the 00A relay included in the tenth group of A relays; whereby the directory number of the private subscriber line 407 includes the digits 00 and the directory number of the private subscriber line 407 may be 0099. Similarly, the S lead S434 extends to the line switch 424 individually associated with the party subscriber line 410 and is accessible to the 01A, 02A, 03A and 04A relays included in the tenth group of A relays; whereby the directory number of the party subscriber line includes the digits 01, 02, 03 or 04 and the directory number of the party subscriber substations TS1, TS2, TS3 and TS4 connected to the party subscriber line 410 may be, respectively, 0100, 0200, 0300 and 0400.

Also the detector 2900 comprises 1,000 test leads arranged in ten groups of 100 each, each A relay in each group of ten being operative to connect the associated group of 100 S leads to the associated group of 100 test leads.

Further the detector 2900 comprises ten B relays 0B to 9B, inclusive, individually associated with the corresponding groups of A relays, the tenth B relay 0B being individually associated with the tenth group of A relays 00A to 09A, inclusive. Further the detector 2900 comprises four hold conductors C3401, C3402, C3403 and C3404 which are suitably multiplied to make contacts provided on the various B relays. More particularly, the first hold conductor C3401 is multiplied via the contacts of appropriate ones of the B relays to the windings of the various ones of the A relays in each group corresponding to the private subscriber substations and to the first party subscriber substations; while the second, third and fourth hold conductors C3402, C3403 and C3404, respectively, are multiplied via the contacts of appropriate ones of the B relays to the windings of the various ones of the A relays in each group, respectively corresponding to the second, third and fourth party subscriber substations. For example, the first hold conductor C3401 is multiplied via the contacts 0B0 to the winding of the A relay 00A corresponding to the group of private subscriber substations, including the private subscriber substations TP etc., and via the contacts 0B1 to the winding of the A relay 01A corresponding to a group of first party subscriber substations, including the first party subscriber substation TS1. Similarly, the second, third and fourth hold conductors C3402, C3403 and C3404, respectively, are multiplied via the contacts 0B2, 0B3 and 0B4 to the windings of the A relays 02A, 03A and 04A, respectively, corresponding to groups of second, third and fourth party subscriber substations, respectively including the party subscriber substations TS2, TS3 and TS4.

Further the detector 2900 comprises ten C relays 0C to 9C, inclusive, respectively corresponding to the ten groups of 100 test leads and ten test conductors C3500 to C3509, inclusive. Each C relay is operative to connect the corresponding group of 100 test leads to the corresponding one of the test conductors. For example, the ninth C relay 9C is operative to connect the ninth group of 100 test leads to the ninth test conductor C3509. Also the detector 2900 comprises ten D relays 0D to 9D, inclusive, respectively corresponding to the ten groups of 100 test leads and ten E relays 0E to 9E, inclusive. Each D relay is operative to connect the corresponding group of 100 test leads to 100 riser conductors included in an associated riser cable 3000; while each E relay is operative to connect a corresponding group of ten riser conductors in the riser cable 3000 to the ten corresponding test conductors C3500 to C3509, inclusive. For example, when the ninth D relay 9D and the ninth E relay 9E are operated the ninth group of 100 test leads are connected to the corresponding 100 riser conductors in the riser cable 3000 and the ninth group of ten riser conductors in the riser cable 3000 are respectively connected to the ten test conductors C3500 to C3509, inclusive.

Further the detector 2900 comprises ten amplifiers or detecting units 0AMP to 9AMP, inclusive, respectively connected to the ten test conductors C3500 to C3509, inclusive, and ten test stop relays 0R to 9R, inclusive, respectively associated with the ten amplifiers 0AMP to 9AMP, inclusive. Also the detector 2900 comprises ten test mark relays 0T to 9T, inclusive, ten test lock relays 0S to 9S, inclusive, ten step relays 0K to 9K, inclusive, and a first set of four cycle relays KA, KB, KC and KD. Further the detector 2900 comprises a number of finder relays 1F to 6F, inclusive, individually corresponding to the various register translators, the finder relay 6F individually corresponding to the register translator 1700; and a second set of four cycle relays FA, FB, FC and FD. Further the detector 2900 comprises, in addition to the relays mentioned, a relay group including a start relay R3210, a stop relay R3220, a hold relay R3230, two test relays R3240 and R3250, four control relays R3260, R3270, R3280 and R3310, a mark relay R3290, two pulse relays R3315 and R3320, two pulse control relays R3330 and R3335, a first test relay R3340, a lock relay R3345, a second test relay R3350, an alarm relay R3360, a control relay R3170 and two switching relays R3710 and R3810. Also the detector 2900 comprises a tone generator 3160 which is preferably in the form of a push-pull oscillator operative to produce an alternating current having a frequency of approximately 2000 cycles per second and being of a substantially sine wave form. Further the detector 2900 comprises a coupling transformer 410, a reset key K3370, an alarm A3375, and a control network connected and arranged in a manner more fully described hereinafter.

Further the detector 2900 comprises four groups of marking leads 3801, 3701, 3802 and 3601 of the WXYZ type which are respectively utilized for the purpose of marking the first, second, third and fourth digits of a detected directory number. Fore particularly, the WXYZ conductors in the first and third groups of marking leads 3801 and 3802 are marked by the various step relays 0K to 9K, inclusive, while the WXYZ conductors in the second and fouth groups of marking leads 3701 and 3601 are respectively marked by the various test lock relays 0S to 9S, inclusive, and by the various test mark relays 0T to 9T, inclusive.

More particularly, it is pointed out that the WXYZ conductors in each of the groups of marking leads 3801, 3802, 3701 and 3601 are marked in accordance with a code arrangement. For example, the various step relays 0K to 9K, inclusive, mark the WXYZ conductors in the first group of marking leads 3801 in accordance with the particular thousand digit of the directory number of the calling subscriber line terminating at exchange 4 zone 84 and detected by the detector 2900, and in accordance with the following code:

| Particular thousand digit | Marked WXYZ conductors in the first group of marking leads 3801 |
|---|---|
| 1 | W and X |
| 2 | W and Y |
| 3 | W and Z |
| 4 | X and Y |
| 5 | X and Z |
| 6 | Y and Z |
| 7 | W |
| 8 | X |
| 9 | Y |
| 0 | Z |

Figure 4:
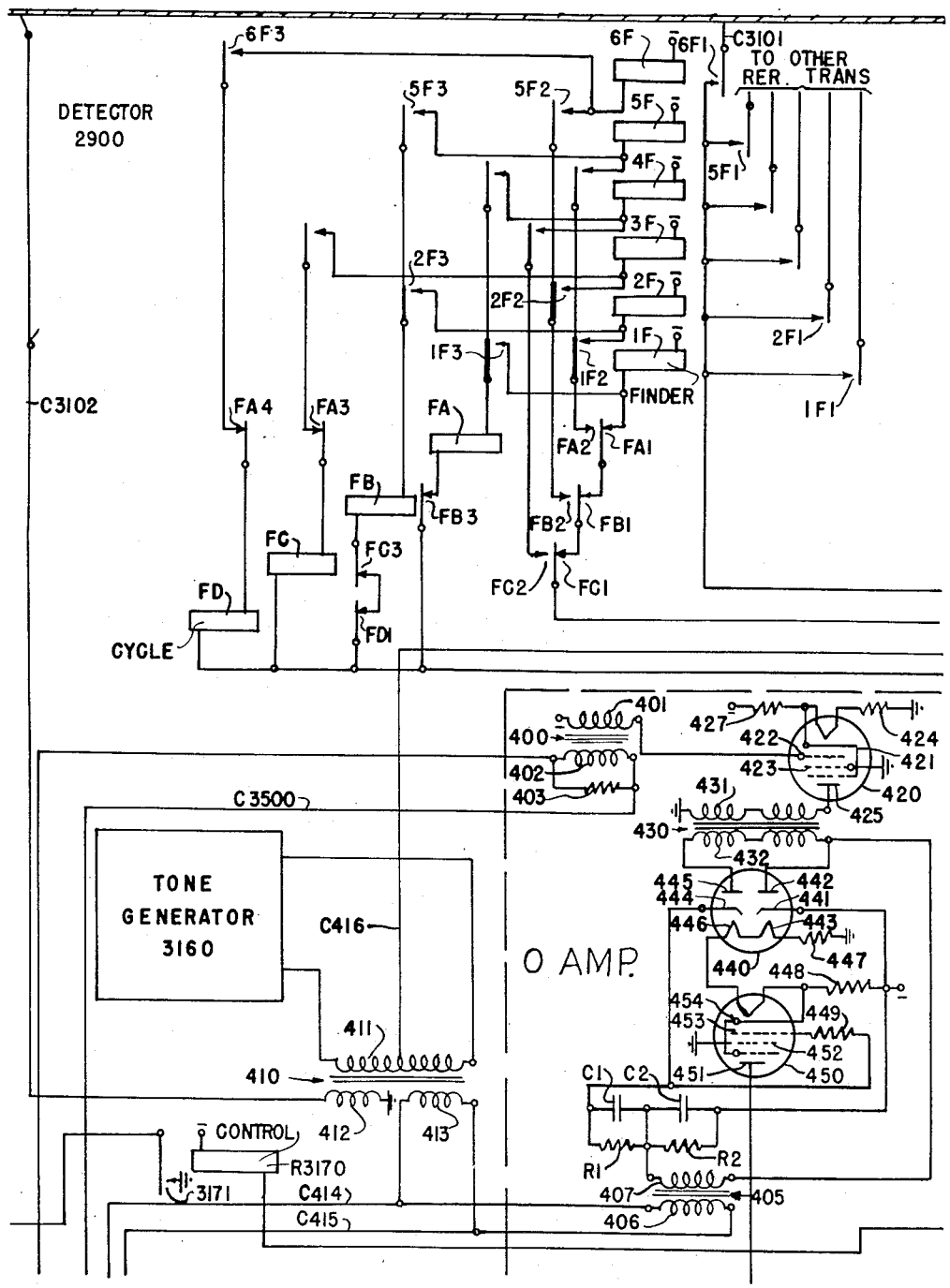
Figure 5:
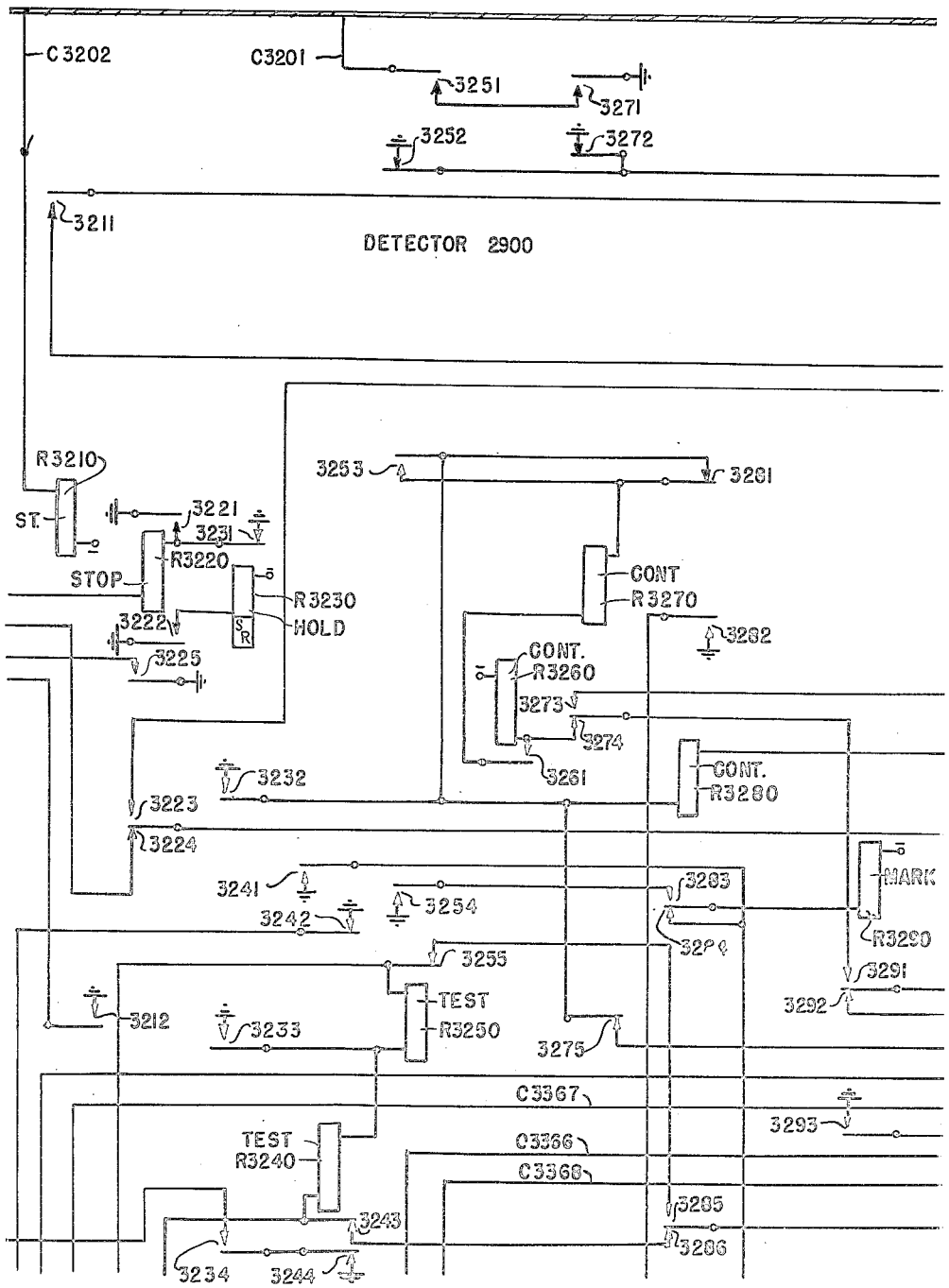

Preferably, in the detector 2900, each of the amplifiers or individual detecting units is identical to the tenth amplifier 0AMP; which amplifier comprises a vacuum tube network, shown in Fig. 4, including a driver vacuum tube 420, a rectifier vacuum tube 440, an amplifier vacuum tube 450, three coupling transformers 400, 430 and 465, a bridge circuit including two resistors R1 and R2 and two condensers C1 and C2; and a control network connected and arranged in a maner more fully explained hereinafter. Preferably, the driver tube 420 is of type 38, including a plate 425, a screen grid 423, a control grid 422 and an indirectly heated cathode 421; the rectifier tube 440 is of type 6H6, including two plates 442 and 445 provided with two corresponding indirectly heated cathodes 441 and 444; while the amplifier tube 450 is of type 38, including a plate 451, a screen grid 452, a control grid 453 and an indirectly heated cathode 454.

A better understanding of the connection and arrangement of the apparatus incorporated in the telephone system will be facilitated from a consideration of the general operation thereof in conjunction with the detailed operation of the detector 2900 incident to the extension of a metropolitan toll call from exchange 4 zone 84, as will appear hereinafter.

*General operation of the telephone system*

Considering now the general operation of the telephone system, it is noted that, when a metropolitan toll call is extended from one of the private subscriber substations or one of the party subscriber substations in exchange 4 zone 84 to a very remote exchange in zone 84 or to an exchange in another zone, a special toll ticket individual to the toll call is prepared therefor by the toll ticketing apparatus; which toll ticket bears the various items of record information pertaining thereto including the identification of the calling private or party subscriber substation, the identification of the called zone and exchange of the called subscriber substation, as well as the terminal designation of the called subscriber substation, the rate applicable to the call, the time duration of the call and perhaps the charge item in monetary values which is to be assessed for the call. The identification of the terminal of the calling private or party subscriber substation in exchange 4 zone 84 is performed by virtue of the operation of the detector 2900, as explained more fully below.

Assuming that a metropolitan toll call is initiated at the calling private subscriber substation TP and is to be extended to a called subscriber substation in an exchange in a different zone, the call is first initiated at the calling private subscriber substation TP when the subscriber thereat removes the receiver of the telephone instrument from its associated switchhook; whereupon the line switch 423 individual to the private subscriber line 407 extending to the calling private subscriber substation TP is controlled and operates to seize a trunk extending to an idle primary selector. For example, the line switch 423 may seize the trunk 462 extending to the primary selector 600; whereupon the finder F610 individual to the primary selector 600 operates to seize the conductors extending to an idle primary register, such, for example, as the conductors extending to the primary register 1200. At this time the primary register 1200 operates in order to cause dial tone to be returned over the finder F610, the primary selector 600, the trunk 462, the line switch 423 and the private subscriber line 407 to the calling private subscriber substation TP; whereupon the subscriber at the calling private subscriber substation TP proceeds to dial the directory number of the called subscriber substation. The registration of the code portion of the directory number of the called subscriber substation in the primary register 1200 indicates that the call is a metropolitan toll call, whereby the register translator allotter 1600 is controlled in order to cause the finder F1610 individually associated therewith to assign an idle one of the register translators, such for example, as the register translator 1700. The assigned register translator 1700 is controlled, whereby the finder F2290 individually associated therewith is operated to select the conductors extending to the calling primary register 1200. The code digits registered in the primary register 1200 are then transferred to the register translator 1700 and registered therein. Also the first digit of the numerical portion of the directory number of the called subscriber substation is registered in the primary register 1200 and is then transferred to the register translator 1700 and registered therein. The remainder of the digits of the numerical portion of the directory number of the called subscriber substation are received by the primary register 1200 and repeated to the register translator 1700 and registered therein.

The register translator 1700 then operates in order to translate the digits of the code portion of the registered directory number into suitable routing directing digits; and then operates to transmit both the routing directing digits and the digits of the numerical portion of the registered directory number over the primary register 1200 and the finder F610 to the primary selector 600. The primary selector 600 responds to the first digit received from the register translator 1700 and operates to select a corresponding group of trunks and then operates to select an idle trunk in the previously selected group. For example, the primary selector 600 may operate to select the trunk 780 extending to the toll ticket repeater 800. The remainder of the digits are transmitted from the register translator 1700 via the finder F2290, the primary register 1200, the finder F610, the primary selector 600 and the trunk 780 to the toll ticket repeater 800. The toll ticket repeater 800 repeats the first digit received thereby over the trunk 907 to the individually associated toll selector 513, whereby the toll selector 513 operates to select a corresponding group of toll lines and then operates to select an idle one of the toll lines in the previously selected group. The remainder of the digits received by the toll ticket repeater 800 are repeated thereby over the trunk 907 and the toll selector 513 to the seized toll line, whereby switching equipment associated with the seized toll line in the called exchange in the called zone operates in accordance with conventional practice to extend the connection to the called subscriber substation therein.

Also the registration of the digits of the code portion of the directory number in the register translator 1700 indicates that the present call is a metropolitan toll call and that the terminal of the calling subscriber substation in exchange 4 zone 84 must be identified; whereby the register translator 1700 operates to cause ground potential to be applied to the start conductor C3202 in order to initiate operation of the detector 2900. Also during the operation of the primary register 1200 a detection is performed in the event the calling subscriber substation is of the party type, whereby the particular position of the calling party subscriber substation on the associated party subscriber line is detected. Also this detection by the primary register 1200 is transferred to the register translator 1700.

Further the register translator 1700 causes ground potential to be applied to one of the hold conductors C3401, C3402, C3403 or C3404, depending upon the character of the calling subscriber substation. More specifically, ground potential is applied to the first hold conductor C3401 in the event the calling subscriber substation is of the private type or is the first party subscriber substation; whereas, ground potential is applied to the respective second, third or fourth hold conductors C3402, C3403 and C3404 in the event the calling subscriber substation is of the party type and is the respective second, third or fourth party subscriber substation on the associated party subscriber line. Also the register translator 1700 operates to apply battery potential to the marking conductor C3101 individual thereto, thereby to mark the register translator 1700 as the calling register translator to the detector 2900.

The detector 2900 operates in response to the application of ground potential to the start conductor C3202 and finds the particular calling register translator 1700 due to the application of battery potential on the marking conductor C3101 thereof. The detector 2900 then operates to detect the terminal of the calling private or party subscriber substation and then marks the four groups of marking leads 3801, 3701, 3802 and 3601, respectively, in accordance with the thousand, hundred, ten and unit digits of the identification of the terminal of the calling subscriber substation, the digits mentioned constituting the numerical portion of the directory number of the calling subscriber substation.

The register translator 1700 registers the four digits identifying the terminal of the calling subscriber substation and transmits this identification together with other information in code form over the finder F2290, the primary register 1200, the finder F610, the primary selector 600 and the trunk 780 to the toll ticket repeater 800, which code information representing certain items of record information pertaining to the present call is stored in the toll ticket repeater 800. At this point it is noted that the register translator 1700 is so interlocked that it will not operate to transmit the last numerical digit to the toll ticket repeater 800 in order to effect the setting up of the connection unless the detector 2900 operates to detect the terminal of the calling subscriber substation and the register translator 1700 operates to transmit all of the code information mentioned to the toll ticket repeater 800 to be registered therein.

However, assuming that the detector 2900 detects the terminal of the calling private subscriber substation TP and the register translator 1700 operates to transmit all of the code information mentioned to the toll ticket repeater 800, the register translator 1700 operates to transmit the last numerical digit in order to effect the setting up of the connection to the called subscriber substation, as previously noted. After the detector 2900 has operated to detect the terminal of the calling subscriber substation it is released; and after the register translator 1700 has transmitted the last numerical digit to the toll ticket repeater 800 it is released, together with the primary register 1200. At this time the various items of record information pertaining to the connection are registered in code form in the toll ticket repeater 800; and when the subscriber at the called subscriber substation answers the call the toll ticket repeater 800 operates to begin a timing operation in order to establish the time duration of the established connection.

Subsequently, when the subscriber at the calling private subscriber substation TP in exchange 4 zone 84 replaces the receiver of the telephone instrument upon its associated switchhook, the line switch 423, the primary register 600 and the toll selector 513, as well as the switching apparatus in the called exchange, are released. However, the toll ticket repeater 800 is not released and the associated printer controller allotter is controlled in order to cause an idle one of the printer controllers to seize the toll ticket repeater 800. The items of code information pertaining to the established connection are then transferred from the toll ticket repeater 800 to the connected printer controller and the toll ticket repeater 800 is released. The printer controller then controls the associated date and time unit as well as the associated printer link, whereby both the toll ticket printer and the record printer are controlled in order, respectively, to produce an individual toll ticket and an entry upon a common record of the various items of record information in conjunction with the established connection, whereby the last-mentioned equipment is then released.

In view of the foregoing explanation of the mode of operation of the apparatus incorporated in the telephone system to set up a metropolitan toll call from the calling private subscriber substation TP in exchange 4 zone 84 to a called subscriber substation in the associated exchange and zone, and to produce a toll ticket and an entry on a common record of the various items of record information pertaining thereto, it will be understood that this apparatus is operative in a substantially identical manner to set up a metropolitan toll call from any calling subscriber substation in exchange 4 zone 84 to a called subscriber substation in the associated exchange and zone and to produce a toll ticket and an entry on a common record of the various items of record information pertaining thereto. For example, the apparatus is operative to set up a metropolitan toll call from any one of the calling party subscriber substations TS1, TS2, TS3 or TS4 connected to the party subscriber line 410 to a called subscriber substation in the associated exchange and zone and to produce a toll ticket and an entry on a common record of the various items of record information pertaining thereto. In this connection it is pointed out that, when a metropolitan toll call is extended from one of the calling party subscriber substations TS1, TS2, TS3 or TS4, the primary register 1200 is selectively controlled by the calling device at the calling party subscriber substation in order to identify the position of the calling party subscriber substation on the associated party subscriber line 410 and to transmit the identification to the register translator 1700. The register translator 1700 then operates selectively to apply ground potential to one of the marking conductors C3401, C3402, C3403 or C3404 in accordance with the identification of the position of the calling party subscriber substation on the associated party subscriber line 410. More particularly, ground potential is respectively applied to the hold conductor C3401, C3402, C3403 and C3404 when the calling party subscriber substation is respectively the party subscriber substations TS1, TS2, TS3 and TS4.

The application of ground potential to the hold conductors C3401, C3402, C3403 and C3404 governs the operation of the detector 2900, whereby the directory numbers of the respective calling party subscriber substations TS1, TS2, TS3 and TS4 are detected as 0100, 0200, 0300 and 0400. The detector 2900 then operates to mark the four digits of the detected directory number of the calling party subscriber substation upon the corresponding groups of WXYZ marking leads 3801, 3701, 3802 and 3601, in the manner previously explained.

*Detailed operation of the detector 2900*

As previously explained in conjunction with the general operation of the telephone system incident to the setting up of the connection from the calling private subscriber substation TP in exchange 4 zone 84 to the called subscriber substation in the associated exchange and zone, the register translator 1700 operates to apply ground potential to the start conductor C3202, battery potential to the test conductor C3101 and ground potential to the first marking conductor C3401. The application of ground potential to the start conductor C3202 completes an obvious circuit for energizing the winding of the start relay R3210 in the detector 2900, thereby to cause the latter relay to operate; while the application of battery potential to the test conductor C3101 extending to the detector 2900 marks the register translator 1700 as a calling register translator.

Upon operating, the start relay R3210 completes, at the contacts 3211, a circuit for energizing in multiple the upper and lower windings of the pulse relay R3315; this circuit extending from ground at the contacts 3252 and 3272 by way of the contacts 3352, 3211 and 3316 and the upper and lower windings of R3315 to battery. When thus energized the pulse relay R3315 operates, thereby to interrupt, at the contacts 3316, the above-traced circuit for energizing in multiple the upper and lower windings thereof; whereupon the upper and lower windings of the pulse relay R3315 are effectively short-circuited in series through the condenser 3318 in order to cause the latter relay to restore shortly thereafter. Accordingly, the pulse relay R3315 operates intermittently at a predetermined rate, depending upon the characteristic of the associated condenser 3318.

The first time the pulse relay R3315 operates and restores it completes and then interrupts, at the contacts 3317, a circuit, including the contacts 3224, FC1, FB1 and FA1, for energizing the winding of the finder relay 1F. When thus energized the finder relay 1F operates to complete, at the contacts 1F3, a holding circuit for energizing the winding thereof in series with the cycle relay FA; this circuit extending from ground by way of the contacts 3212, FB3, the winding of FA, the contacts 1F3 and the winding of 1F to battery. When this holding circuit is completed the finder relay 1F is retained in its operated position and the cycle relay FA operates. Also, upon operating, the finder relay 1F prepares, at the contacts 1F2, a point in a circuit traced hereinafter for energizing the winding of the finder relay 2F; and prepares, at the contacts 1F1, a circuit, including the contacts 3231 and the test conductor extending to the first register translator, not shown, for energizing the winding of the stop relay R3220.

Assuming that the register translator 1700 which constitutes the sixth register translator is the first calling register translator, the above-mentioned circuit for energizing the winding of the stop relay R3220 is not completed and further operation of the finder relays 2F etc. takes place at this time. Upon operating, the cycle relay FA interrupts, at the contacts FA1, a further point in the previously traced original circuit for energizing the winding of the finder relay 1F; and prepares, at the contacts FA2, a further point in the previously mentioned circuit for energizing the winding of the finder relay 2F. Also the cycle relay FA interrupts, at the contacts FA3 and FA4, further points in circuits traced hereinafter for respectively energizing the windings of the cycle relays FC and FD. Upon the second operation and restoration of the pulse relay R3315 there is completed and interrupted, at the contacts 3317, a circuit substantially identical to that previously traced and including the contacts 3224, FC1, FB1, FA2 and 1F2 for energizing the winding of the finder relay 2F, whereupon the latter relay operates. Upon operating, the finder relay 2F completes, at the contacts 2F3, a holding circuit for energizing the winding thereof in series with the winding of the cycle relay FB; this circuit extending from ground by way of the contacts 3212, FD1 and FC3, the winding of FB, the contacts 2F3 and the winding of 2F to battery. When this holding circuit is completed the finder relay 2F is retained in its operated position and the cycle relay FB operates. Also the finder relay 2F prepares, at the contacts 2F1, a test circuit substantially identical to that previously mentioned for energizing the winding of the stop relay R3220; and prepares, at the contacts 2F2, a circuit traced hereinafter for energizing the winding of the finder relay 3F. Upon operating, the cycle relay FB interrupts, at the contacts FB1, a further point in the previously traced original circuit for energizing the winding of the finder relay 2F; and prepares, at the contacts FB2, a further point in the previously mentioned circuit for energizing the winding of the finder relay 3F. Also the cycle relay FB interrupts, at the contacts FB3, the previously traced holding circuit for energizing the winding of the finder relay 1F in series with the cycle relay FA, thereby to cause the relays mentioned to restore. Upon restoring, the cycle relay FA reprepares, at the contacts FA3 and FA4, further points in the previously mentioned circuits for respectively energizing the windings of the cycle relays FC and FD; prepares, at the contacts FA1, a further point in the previously traced original circuit for energizing the winding of the finder relay 1F; and interrupts, at the contacts FA2, a further point in the previously traced original circuit for energizing the winding of the finder relay 2F. Upon restoring, the finder relay 1F interrupts, at the contacts 1F3, a further point in the previously traced holding circuit for energizing the winding thereof in series with the winding of the cycle relay FA; interrupts, at the contacts 1F2, a further point in the previously traced original circuit for energizing the winding of the finder relay 2F; and interrupts, at the contacts 1F1, the previously traced test circuit extending between the winding of the stop relay R3220 and the first register translator, not shown.

In view of the foregoing explanation of the mode of operation of the finder relays 1F and 2F in conjunction with the cycle relays FA and FB, it will be understood that the cycle relays 1F to 6F, inclusive, are operated sequentially to test the respective register translators in order to detect the calling register translator. Further it is pointed out that the finder relays 1F to 6F, inclusive, are operative continuously through repeated cycles until the calling register translator is detected thereby. At this point it is noted that the finder relays 1F and 4F lock in series with the cycle relay FA; the finder relays 2F and 5F lock in series with the cycle relay FB; the cycle relay 3F locks in series with the cycle relay FC; and the finder relay 6F locks in series with the cycle relay FD, in the manner explained above. In the present example, when the finder relay 6F operates it completes, at the contacts 6F3, a holding circuit substantially identical to that previously traced, and including the contacts 3212, FA4 and 6F3 for energizing the winding thereof in series with the winding of the cycle relay FD; whereupon the finder relay 6F is retained in its operated position and the cycle relay FD operates. Upon operating, the cycle relay FD interrupts, at the contacts FD1, the previously mentioned holding circuit for energizing in series the winding of the finder relay 5F and the winding of the cycle relay FB, thereby to cause the relays mentioned to restore. Also the finder relay 6F completes, at the contacts 6F1, a test circuit, including the winding of the stop relay R3220 and the test conductor C3101 extending to the calling register translator 1700. More particularly, at this time, a circuit is completed for energizing the winding of the stop relay R3220 in the detector 2900; this circuit extending from ground by way of the contacts 3231, the winding of R3220 and the contacts 6F1 to battery potential appearing upon the test conductor C3101. When this circuit is completed the stop relay R3220 operates.

In the register translator 1700, the storage relay R2850 operates to complete, at the contacts 2852, a connection between the S lead S433 individually associated with the private subscriber line 407 and the detector 2900. This connection extends from the S lead S433 by way of the line switch 423, the control conductor of the trunk 462, C645, C1393, the contacts 2852, C3102 and the winding 412 of the coupling transformer 410 to ground potential. Also it is noted that the S lead S433 extending to the line switch 423 individually associated with the private subscriber line 407 also extends directly to the detector 2900, the S lead S433 appearing before the tenth A relay in the tenth group, the A relay mentioned being 00A, as previously noted.

Returning now to the operation of the detector 2900, upon operating, the stop relay R3220 completes, at the contacts 3221, a holding circuit for energizing the winding thereof, including the contacts 6F1 and the test conductor C3101; and completes, at the contacts 3222, an obvious circuit for energizing the winding of the hold relay R3230, thereby to cause the latter relay to operate. Further the stop relay R3220 interrupts, at the contacts 3224, a common point in the previously traced circuit for respectively energizing the windings of the finder relays 1F to 6F, inclusive, thereby positively to prevent further operation of these relays at this time. Further the stop relay R3220 completes, at the contacts 3225, an obvious path for applying ground potential to the conductor C416 extending to the mid tap of the winding 411 of the coupling transformer 410 and consequently to the tone generator 3160; whereby the tone generator 3160 is set into oscillation in order to produce an alternating current of approximately 2000 cycles per second which traverses the primary winding 411 of the coupling transformer 410. The 2000 cycle alternating current traversing the primary winding 411 of the coupling transformer 410 induces corresponding alternating current voltages in the secondary windings 412 and 413 thereof. The 2000 cycle alternating current voltage induced in the secondary winding 413 of the coupling transformer 410 is connected between the conductors C414 and C415, which conductors extend to each of the ten amplifiers 9AMP to 0AMP, inclusive. More particularly, in the amplifier 0AMP, the primary winding 406 of the coupling transformer 405 is connected directly across the conductors C414 and C415, whereby it is energized with alternating current of 2000 cycles. Similarly, the primary windings of the coupling transformers in the other amplifiers 1AMP to 9AMP, inclusive, are energized. One terminal of the secondary winding 412 of the coupling transformer 410 is connected to the conductor C3102 and the other terminal thereof is connected to ground potential, as previously noted, whereby the 2000 cycle alternating voltage is impressed upon the S lead S433 individually extending to the line switch 423 individually associated with the calling subscriber line 407. Finally the stop relay R3220 prepares, at the contacts 3223, a circuit traced hereinafter for energizing the winding of the pulse relay R3320.

The next time the pulse relay R3315 operates and then restores it completes and then interrupts, at the contacts 3317, the previously mentioned circuit, including the contacts 3223 and 3331, for energizing the winding of the pulse relay R3320, thereby to cause the latter relay to operate. Upon operating, the pulse relay R3320 prepares, at the contacts 3321, an obvious holding circuit, including the contacts 3336, for energizing the lower winding of the pulse control relay R3330 in series with the winding thereof; which circuit is completed when the pulse relay R3315 restores; whereupon the pulse control relay R3330 operates and the pulse relay R3320 is retained in its operated position. Upon the succeeding operation of the pulse relay R3315 a circuit, including the contacts 3317, 3223 and 3332, is completed for energizing the upper winding of the pulse control relay R3330 in series with the winding of the pulse control relay R3335; whereupon the pulse control relay R3330 is retained in its operated position and the pulse control relay R3335 operates. Upon operating, the pulse control relay R3335 interrupts, at the contacts 3336, the previously traced holding circuit for energizing the lower winding of the pulse control relay R3330 in series with the winding of the pulse relay R3320, thereby to cause the pulse relay R3320 to restore. Upon the subsequent restoration of the pulse relay R3315 there is interrupted, at the contacts 3317, the previously traced circuit for energizing the upper winding of the pulse control relay R3330 in series with the winding of the pulse control relay R3335, thereby to cause the relays mentioned to restore. In view of the foregoing explanation of the mode of operation of the pulse relay R3315 in conjunction with the pulse relay R3320 and the pulse control relays R3330 and R3335, it will be understood that the pulse relay R3320 operates and restores upon each two operations and restorations of the pulse relay R3315. Thus the pulse relay R3320 operates at one-half the rate of the relay R3315.

Each time the pulse relay R3320 operates it completes, at the contacts 3322, an obvious path, including the contacts 3292, for applying ground potential to the pulse conductor C3363. The first time ground potential is applied to the pulse conductor C3363 an obvious circuit, including the contacts KC1, KB1 and KA1, is completed for energizing the winding of the first step relay 1K. When thus energized the first step relay 1K operates to complete, at the contacts 1K3, an obvious path, including the contacts KB3 and the grounded hold conductor C3364, for short-circuiting the winding of the cycle relay KA. Subsequently, when ground potential is removed from the pulse conductor C3363 a holding circuit is completed for energizing in series the winding of the first step relay 1K and the winding of the cycle relay KA; this circuit extending from the grounded hold conductor C3364 by way of the contacts KB3, the winding of KA, the contacts 1K3 and the winding of 1K to battery. When this series holding circuit is completed the first step relay 1K is retained in its operated position and the cycle relay KA operates. Upon operating, the cycle relay KA interrupts, at the contacts KA3 and KA4, points in holding circuits traced hereinafter for respectively energizing the windings of the cycle relays KC and KD; interrupts, at the contacts KA1, a further point in the previously traced original circuit for energizing the winding of the first step relay 1K; and prepares, at the contacts KA2, a circuit traced hereinafter for energizing the winding of the second step relay 2K. The next time ground potential is applied to the pulse conductor C3363 the previously mentioned circuit for energizing the winding of the second step relay 2K is completed; this circuit extending from the grounded pulse conductor C3363 by way of the contacts KC1, KB1, KA2 and 1K4, and the winding of 2K to battery. When thus energized the second step relay 2K operates to complete, at the contacts 2K3, a path substantially identical to that previously traced for short-circuiting the winding of the cycle relay KB. Subsequently, when ground potential is removed from the pulse conductor C3363 a holding circuit is completed for energizing in series the winding of the second step relay 2K and the winding of the cycle relay KB; this circuit extending from the grounded hold conductor C3364 by way of the contacts KC3, the winding of KB, the contacts 2K3 and the winding of 2K to battery. When this holding circuit is completed the second step relay 2K is retained in its operated position and the cycle relay KB operates. Upon operating, the cycle relay KB interrupts, at the contacts KB3, the previously traced holding circuit for energizing in series the winding of the cycle relay KA and the winding of the first step relay 1K, thereby to cause the latter relays to restore. Also the cycle relay KB interrupts, at the contacts KB1, a further point in the previously traced original circuit for energizing the winding of the second step relay 2K; and prepares, at the contacts KB2, a point in a circuit substantially identical to that previously traced for energizing the winding of the third step relay 3K. Upon restoring, the cycle relay KA prepares, at the contacts KA3 and KA4, points in the previously mentioned holding circuits for respectively energizing the windings of the cycle relays KC and KD.

In view of the above description of the cycle of operation of the step relays 1K, 2K etc., it will be understood that the step relays 1K to 0K, inclusive, and the cycle relays KA, KB, KC and KD are operated in the following order:

| Number of operations and restorations of the pulse relay R3320 | Operated step and cycle relays |
| --- | --- |
| 1 | 1K and KA |
| 2 | 2K and KB |
| 3 | 3K and KC |
| 4 | 4K and KA |
| 5 | 5K and KB |
| 6 | 6K and KC |
| 7 | 7K and KA |
| 8 | 8K and KB |
| 9 | 9K and KC |
| 10 | 0K and KD |

Also it is pointed out that the step relays 1K to 0K, inclusive, and the cycle relays KA, KB, KC and KD are operative continuously through a plurality of cycles of the character noted above until operation thereof is arrested, in a manner more fully explained hereinafter. Also at this point it is noted that, upon operating, the hold relay R3230 interrupts, at the contacts 3231, the previously traced original circuit for energizing the winding of the stop relay R3220 in the detector 2900; and completes, at the contacts 3232, the previously mentioned path, including the contacts 3275, for applying ground potential to the hold conductor C3364. Also the hold relay R3230 prepares, at the contacts 3233, circuits traced hereinafter for respectively energizing the windings of the test relays R3250 and R3240; and completes, at the contacts 3234, an obvious circuit, including the contacts 3244, for energizing the winding of the control relay R3170. When thus energized the control relay R3170 operates to complete, at the contacts 3171, obvious multiple circuits for energizing the windings of the ten C relays 0C to 9C, inclusive, thereby to cause the latter relays to operate for a purpose more fully explained hereinafter.

Also, upon operating, the first step relay 1K completes, at the contacts 1K2, an obvious path, including the contacts KA5 and 3717, for applying ground potential to the first marking conductor in the cable 3801; thereby to complete a circuit for energizing the winding of the first B relay 1B, not shown, in the associated group of ten in order to cause the latter relay to operate, whereby the first group of 1,000 S leads is tested in a manner more fully explained hereinafter. Similarly, the second step relay 2K completes, at the contacts 2K2, an obvious path, including the contacts KB5 and 3714, for applying ground potential to the second marking conductor in the cable 3801; thereby to complete a circuit for energizing the winding of the second B relay 2B, not shown, in the associated group of ten in order to cause the latter relay to operate, whereby the second group of 1,000 S leads is tested; etc. Finally the tenth step relay 0K completes, at the contacts 0K2, an obvious path, including the contacts KD5 and 3719, for applying ground potential to the tenth marking conductor C3800 in the cable 3801; thereby to complete an obvious circuit for energizing the winding of the tenth B relay 0B in the associated group of ten in order to cause the latter relay to operate, whereby the tenth group of 1,000 S leads is tested.

More particularly, upon operating, the tenth B relay 0B prepares, at the contacts 0B0 to 0B9, inclusive, circuits for energizing the windings of the ten A relays in the associated group, the A relays 00A to 09A, inclusive. At this point it is again noted that only the ones of the A relays 00A to 09A, inclusive, which are connected to the first hold conductor C3401 are operated at this time in view of the fact that only the first hold conductor C3401 has ground potential thereon, in the present example. Accordingly, at this time, the A relays 00A, 01A, 05A etc. and 09A are operated; while the A relays 02A, 03A and 04A are not operated, the A relays 02A, 03A and 04A being respectively connected to the second, third and fourth hold conductors C3402, C3403 and C3404, respectively. Accordingly, the tenth B relay 0B is operative to effect the testing of the 1000 S leads in the tenth group in an extremely rapid manner in view of the fact that three hundred of the test leads in the 0 thousand group are eliminated immediately, due to the failure of the A relays 02A, 03A and 04A to operate. The circuits for energizing the windings of the various A relays 00A, 01A, etc. associated with the tenth B relay 0B respectively include the contacts 0B0, 0B1 etc. and the grounded first hold conductor C3401.

When thus energized the tenth A relay 00A operates to connect the tenth group of 100 S leads in the 0 thousand group of S leads to the corresponding tenth group of 100 test leads; the first A relay 01A operates to connect the first group of 100 S leads in the 0 thousand group of S leads to the corresponding first group of 100 test leads; etc. Accordingly, at this time, the tenth group of 100 S leads in the 0 thousand group of S leads is connected by way of the tenth A relay 00A to the tenth group of 100 test leads and therefrom by way of the tenth C relay 0C to the tenth test conductor C3500; the first group of 100 S leads in the 0 thousand group of S leads is connected by the first A relay 01A to the first group of 100 test leads and therefrom by the first C relay 1C to the first test conductor C3501; etc. The tenth test conductor C3500 is connected by way of the primary winding 402 of the coupling transformer 400 and the parallel connected resistor 403 in the tenth amplifier 0AMP to ground potential and consequently to one terminal of the secondary winding 412 of the coupling transformer 410; the first test conductor C3501 is connected by way of the primary winding of the coupling transformer and the parallel connected resistor in the first amplifier 1AMP to ground potential and consequently to one terminal of the secondary winding 412 of the coupling transformer 410; etc. At this time, the S lead S433 extending to the line switch 423 individually associated with the private subscriber line 407 is connected by way of the previously traced path to the primary winding 402 of the coupling transformer 400 in the tenth amplifier 0AMP, thereby to complete a circuit therethrough; however, the other circuits via the coupling transformers in the other nine amplifiers 1AMP to 9AMP, inclusive, are not completed due to the fact that the numerical portion of the directory number of the private subscriber line 407 is 0099, as previously noted.

Hence, at this time, the tenth amplifier 0AMP operates in order to complete an obvious circuit for energizing the winding of the tenth test stop relay 0R. When thus energized the tenth test stop relay 0R operates to complete, at the contacts 0R1, an obvious circuit, including the contacts 3242, for energizing the left-hand winding of the tenth test lock relay 0S, thereby to cause the latter relay to operate. Upon operating, the tenth test lock relay 0S completes, at the contacts 0S1, an obvious holding circuit, including the contacts 3233, for energizing the right-hand winding thereof in series with the winding of the test relay R3240. When this series circuit is completed the tenth test lock relay 0S is retained in its operated position and the test relay R3240 operates. Upon operating, the test relay R3240 interrupts, at the contacts 3242, the previously traced original operating circuit for energizing the left-hand winding of the tenth test lock relay 0S; and completes, at the contacts 3241, an obvious circuit, including the contacts 3284, for energizing the winding of the mark relay R3290, thereby to cause the latter relay to operate. Also the test relay R3240 interrupts, at the contacts 3244, the previously traced circuit for energizing the winding of the control relay R3170, thereby to cause the latter relay to restore and interrupt, at the contacts 3171, the previously traced multiple circuits for energizing the windings of the ten C relays 0C to 9C, inclusive, whereupon the latter relays restore. When the tenth C relay 0C restores it interrupts, at the associated contacts, the previously traced circuit, including the tenth test conductor C3500, for operating the tenth amplifier 0AMP, thereby to cause the latter amplifier to restore in order to effect the restoration of the tenth stop relay 0R. Also, upon operating, the tenth test lock relay 0S completes, at the contacts 0S5, a holding circuit, including the tenth hold conductor C3710 in the cable 3711 and the contacts 00A1, for energizing the winding of the tenth A relay 00A, thereby to retain the latter relay in its operated position.

Upon operating, the mark relay R3290 interrupts, at the contacts 3292, a further point in the previously traced path for applying ground potential to the pulse conductor C3363, thereby positively to arrest further operation of the ten step relays 0K to 9K, inclusive, at this time. Also the mark relay R3290 completes, at the contacts 3293, an obvious path for applying ground potential to the marking conductor C3365 and an obvious multiple path, including the contacts 3313', for applying ground potential to the marking conductor C3366. The application of ground potential to the marking conductor C3365 is effective to complete a path for applying ground potential to certain of the WXYZ conductors in the first group of marking leads 3801, depending upon the particular operated one of the step relays 0K to 9K, inclusive, at this time. In the present example, the tenth step relay 0K occupies its operated position, a holding circuit being completed for energizing the winding of the tenth step relay 0K and the cycle relay KD at this time. The tenth step relay 0K occupies its operated position in view of the fact that one of the ten amplifiers 0AMP to 9AMP, inclusive, was operated incident to the operation of the tenth B relay 0B, the tenth B relay 0B being operated incident to the operation of the tenth step relay 0K, as previously explained. Hence, in the present example, the ground potential appearing upon the marking conductor C3365 is applied by way of the contacts 0K5 and 3812 to the Z conductor in the first group of marking leads 3801. The application of ground potential to the Z conductor in the first group of marking leads 3801 completes a circuit for energizing the winding of the Z relay in the first code storage device in the register translator 1700; whereby the latter relay operates. The marking of the Z conductor in the group of marking conductors 3801 corresponds to the digit 0, whereby the digit 0 is registered in the first code storage device in the register translator 1700. In the detector 2900, the application of ground potential to the marking conductor C3366 is effective to complete a path for applying ground potential to certain of the WXYZ conductors in the second group of marking leads 3701, depending upon the particular operated one of the test lock relays 0S to 9S, inclusive, at this time; which in turn depends upon the operated one of the ten amplifiers 0AMP to 9AMP, inclusive, which was operated during the prior test, as previously explained. In the present example, the tenth test lock relay 0S occupies its operated position, a holding circuit being completed for energizing the right-hand winding thereof in series with the winding of the test relay R3240 at this time. Accordingly the ground potential appearing upon the marking conductor C3366 is applied by way of the contacts 0S2 to the Z conductor in the second group of marking leads 3701. The application of ground potential to the Z conductor in the second group of marking leads 3701 corresponds to the digit 0 and is effective to cause the digit 0 to be registered in the second code storage device in the register translator 1700, in the manner described above.

Further the mark relay R3290 prepares, at the contacts 3291, a circuit for energizing the winding of the control relay R3260. Upon the next operation of the pulse relay R3320 it completes, at the contacts 3322, the previously mentioned circuit, including the contacts 3291 and 3274, for energizing the winding of the control relay R3260, thereby to cause the latter relay to operate. Upon operating, the control relay R3260 completes, at the contacts 3261, an obvious path, including the contacts 3281 and 3232, for short-circuiting the winding of the control relay R3270. Upon the subsequent restoration of the pulse relay R3320 it interrupts, at the contacts 3322, the previously traced original circuit for energizing the winding of the control relay R3260; whereupon a circuit, including the contacts 3232, 3281 and 3261, is completed for energizing the winding of the control relay R3260 in series with the winding of the control relay R3270. When this series circuit is completed the control relay R3260 is retained in its operated position and the control relay R3270 operates. Upon operating, the control relay R3270 interrupts, at the contacts 3274, a further point in the previously traced original circuit for energizing the winding of the control relay R3260; and prepares, at the contacts 3273, a circuit traced hereinafter for energizing the winding of the control relay R3310. Also the control relay R3270 interrupts, at the contacts 3275, the previously traced path for applying ground potential to the hold conductor C3364; thereby to interrupt the previously traced holding circuit for energizing the winding of the tenth step relay 0K in series with the winding of the cycle relay KD, whereupon the relays mentioned restore.

Upon the next operation of the pulse relay R3320 there is completed, at the contacts 3322, the previously mentioned circuit, including the contacts 3291 and 3273, for energizing the winding of the control relay R3310, thereby to cause the latter relay to operate. Upon operating, the control relay R3310 completes, at the contacts 3311, an obvious path, including the contacts 3232, for short-circuiting the winding of the control relay R3280.

Upon the subsequent restoration of the pulse relay R3320 there is interrupted, at the contacts 3322, the previously traced original circuit for energizing the winding of the control relay R3310; whereupon a circuit, including the contacts 3232 and 3311, is completed for energizing the winding of the control relay R3280 in series with the winding of the control relay R3310. When this circuit is completed the control relay R3310 is retained in its operated position and the control relay R3280 operates. Upon operating, the control relay R3280 interrupts, at the contacts 3281, the previouslyl traced holding circuit for energizing in series the windings of the control relays R3260 and R3270, thereby to cause the latter relays to restore; and completes, at the contacts 3282, an obvious circuit for energizing the winding of the switch relay R3810, thereby to cause the latter relay to operate. Upon operating, the switch relay R3810 interrupts, at the contacts 3812 etc., the connections between the first group of WXYZ marking leads 3801 and the marking contacts of the step relays 0K to 9K, inclusive; and completes, at the contacts 3811 etc., obvious connections between the third group of WXYZ marking leads 3802 and the marking contacts of the steps relays 0K to 9K, inclusive. Further the control relay R3280 interrupts, at the contacts 3284, the previously traced circuit for energizing the winding of the mark relay R3290, thereby to cause the latter relay to restore; and prepares, at the contacts 3283, an alternative circuit traced hereinafter for energizing the winding of the mark relay R3290. Further the control relay R3280 interrupts, at the contacts 3286, a further point in a path, including the contacts 3323, 3243 and 3233, which was previously completed for short-circuiting the winding of the test relay R3240 prior to the restoration of the pulse relay R3320 subsequent to the operation of the tenth test lock relay 0S; this arrangement positively prevents operation of the test relay R3240, in the manner explained above, prior to the tenth restoration of the pulse relay R3320 during the first test. Further the control relay R3280 prepares, at the contacts 3285, a similar path, including the contacts 3323, 3285, 3255 and 3233, for short-circuiting the winding of the test relay R3250 prior to the ninth restoration of the pulse relay R3320 subsequent to the operation of the ninth test mark relay 9T, in a manner more fully explained hereinafter; this arrangement positively prevents operation of the test relay R3250, in a manner more fully explained hereinafter, prior to the ninth restoration of the pulse relay R3320 during the second test. Also, upon operating, the test relay R3240 completes, at the contacts 3241, an obvious circuit for energizing the winding of the switch relay R3710, thereby to cause the latter relay to operate. Upon operating, the switch relay R3710 interrupts, at the contacts 3712 etc., further points in the previously traced paths for applying ground potential to the various conductors in the cable 3801; and prepares, at the contacts 3711 etc., points in paths traced hereinafter for applying ground potential to the various conductors in the cable 3901.

Upon restoring, the mark relay R3290 interrupts, at the contacts 3291, a further point in the previously traced original circuit for energizing the winding of the control relay R3310; and interrupts, at the contacts 3293, the previously traced paths for applying ground potential to the marking conductors C3365 and C3366. Further the mark relay R3290 reprepares, at the contacts 3292, the previously traced path for applying ground potential to the pulse conductor C3363. Also, upon operating, the control relay R3310 prepares, at the contacts 3313, a point in a path traced hereinafter for applying ground potential to the marking conductors C3365 and C3367; and completes, at the contacts 3314, an obvious path for applying ground potential to the conductor C3368; thereby to complete a circuit for energizing the winding of one of the ten D relays 0D to 9D, inclusive, depending upon the particular operated one of the ten test lock relays 0S to 9S, inclusive, at this time. In the present example, the tenth test lock relay 0S occupies its operated position; accordingly the application of ground potential to the conductor C3368 completes an obvious circuit, including the contacts 0S4 and the conductor C3700 in cable 3701, for energizing the winding of the tenth D relay 0D. When thus energized the tenth D relay 0D operates to connect the tenth group of 100 test leads to the riser cable 3000, for a purpose more fully explained hereinafter.

Each time the pulse relay R3320 operates and restores it completes and then interrupts, at the contacts 3322, the previously traced path for applying ground potential to the pulse conductor C3363; whereby the step relays 1K, 2K etc. are reoperated sequentially and locked in series with the cycle relays KA, KB etc., in the manner previously explained. At this time, upon operating, the first step relay 1K completes, at the contacts 1K1, an obvious path, including the contacts KA5 and 3716, for applying ground potential to the first conductor in the cable 3901, thereby to complete a circuit for energizing the winding of the first E relay 1E, not shown, in the associated group of ten in order to cause the latter relay to operate, whereby the first group of ten conductors in the riser cable 3000 is tested; the group mentioned comprising one of ten groups in the riser cable 3000 which are connected by way of the operated tenth D relay 0D to the tenth group of 100 test leads; which tenth group of 100 test leads is connected by way of the operated tenth A relay 00A to the tenth group of 100 S leads in the 0 thousand group; the tenth group of 100 S leads in the 0 thousand group including the S lead S433 extending to the line switch 423 individually associated with the private subscriber line 407, as previously noted. Similarly, upon operating, the second step relay 2K completes, at the contacts 2K1, an obvious path, including the contacts KB5 and 3713, for applying ground potential to the second conductor in the cable 3901, thereby to complete a circuit for energizing the winding of the second E relay 2E, not shown, in the associated group of ten in order to cause the latter relay to operate; whereby the second group of ten conductors in the riser cable 3000 is tested, in the manner explained above. Finally the ninth step relay 9K completes, at the contacts 9K1, an obvious path, including the contacts KC5 and 3711, for applying ground potential to the ninth conductor C3819 in the cable 3901; thereby to complete an obvious circuit for energizing the winding of the ninth E relay 9E in the associated group of ten in order to cause the latter relay to operate, whereby the ninth group of ten conductors in the riser cable 3000 is tested.

More particularly, upon operating, the ninth E relay 9E completes, at the associated contacts, connections between the ten conductors in the ninth group in the riser cable 3000 and the respective ten test conductors C3500 to C3509, inclusive. At this time the tenth group of 100 S leads in the 0 thousand group is connected by way of the operated tenth A relay 00A to the corresponding tenth group of 100 test conductors; and the ten groups of test conductors in the tenth group of test conductors are connected by the operated tenth D relay 0D to the ten groups of conductors in the riser cable 3000; and the ten conductors in the ninth group in the riser cable 3000 are respectively connected by the ninth E relay 9E to the respective ten test conductors C3500 to C3509, inclusive. Hence, at this time, a circuit is completed for operating the ninth amplifier 9AMP in view of the fact that the S lead S433 extends to the line switch 423 individually associated with the private subscriber line 407; the last two digits of the numerical portion of the directory number of the private subscriber line 407 being 99.

Upon operating, the ninth amplifier 9AMP effects operation of the ninth test stop relay 9R, in the manner previously explained; whereupon the latter relay completes, at the contacts 9R2, an obvious circuit, including the contacts 3312, for energizing the left-hand winding of the test mark relay 9T. When thus energized the test mark relay 9T operates to complete, at the contacts 9T1, a circuit, including the contacts 3233, for energizing the right-hand winding thereof in series with the winding of the test relay R3250. When this series circuit is completed the test mark relay 9T is retained in its operated position and the test relay R3250 operates. At this point it is noted that the previously traced path, including the contacts 3233, 3255, 3285 and 3323, for short-circuiting the winding of the test relay R3250 is completed prior to the ninth restoration of the pulse relay R3320. Upon operating, the test relay R3250 interrupts, at the contacts 3255, a further point in the previously traced path for short-circuiting the winding thereof; and completes, at the contacts 3254, an obvious circuit, including the contacts 3283, for energizing the winding of the mark relay R3290, thereby to cause the latter relay to operate.

Upon operating, the mark relay R3290 interrupts, at the contacts 3292, a further point in the previously mentioned path for applying ground potential to the pulse conductor C3363; thereby positively to arrest further operation of the step relays 0K to 9K, inclusive, at this time. Also the mark relay R3290 prepares, at the contacts 3291, a further point in the previously mentioned circuit for energizing the winding of the control relay R3260; and completes, at the contacts 3293, the previously mentioned path, including the contacts 3313, for applying ground potential to the marking conductors C3365 and C3367. The application of ground potential to the marking conductor C3365 is effective to complete a path for applying ground potential to certain of the WXYZ conductors in the third group of marking leads 3802, depending upon the particular operated one of the step relays 0K to 9K, inclusive, at this time. In the present example, the ninth step relay 9K occupies its operated position, a holding circuit being completed for energizing the winding of the ninth step relay 9K and the cycle relay KC at this time. The ninth step relay 9K occupies its operated position in view of the fact that one of the ten amplifiers 0AMP to 9AMP, inclusive, operated incident to the operation of the ninth E relay 9E, the ninth E relay 9E being operated incident to the operation of the ninth step relay 9K, as previously explained. In the present example, the ground potential appearing upon the marking conductor C3365 is applied by way of the contacts 9K5 and 3813 to the Y conductor in the third group of marking leads 3802. The application of ground potential to the Y conductor in the third group of marking leads 3802 corresponding to the digit 9 causes the digit 9 to be registered in the third code storage device in the register translator 1700, in the manner previously explained. The application of ground potential to the marking conductor C3367 is effective to complete a path for applying ground potential to certain of the WXYZ conductors in the fourth group of marking leads 3601, depending upon the particular operated one of the test mark relays 0T to 9T, inclusive, at this time; which in turn depends upon which of the ten amplifiers 0AMP to 9AMP, inclusive, was operated during the prior test, as previously explained. In the present example, the ninth test mark relay 9T occupies its operated position, a holding circuit being completed for energizing the right-hand winding thereof in series with the winding of the test relay R3250 at this time. Hence in the present example, the ground potential appearing upon the marking conductor C3367 is applied by way of the contacts 9T2 to the Y conductor in the fourth group of marking leads 3601. The application of ground potential to the Y conductor in the fourth group of marking leads 3601 corresponding to the digit 9 is effective to cause the digit 9 to be registered in the fourth code storage device in the register translator 1700.

Upon the next operation of the pulse relay R3320 there is completed, at the contacts 3322, the previously mentioned circuit, including the contacts 3291 and 3274, for energizing the winding of the control relay R3260; thereby to cause the latter relay to operate and complete, at the contacts 3261, an obvious path, including the contacts 3253 and 3232, for short-circuiting the winding of the control relay R3270. Upon the next restoration of the pulse relay R3320 there is interrupted, at the contacts 3322, the previously traced original operating circuit for energizing the winding of the control relay R3260; whereupon a circuit, including the contacts 3232, 3253 and 3261, is completed for energizing the winding of the control relay R3260 in series with the winding of the control relay R3270. When this circuit is completed the control relay R3260 is retained in its operated position and the control relay R3270 operates.

Upon operating, the control relay R3270 interrupts, at the contacts 3275, the previously mentioned path for applying ground potential to the hold conductor C3364; thereby to interrupt the previously mentioned holding circuit for energizing the winding of the ninth step relay 9K in series with the winding of the cycle relay KC, thereby to cause the relays mentioned to restore. Also the control relay R3270 interrupts, at the contacts 3272, the previously traced circuit for energizing in multiple the upper and lower windings of the pulse relay R3315, thereby positively to arrest further operation of the latter relay at this time. Finally the control relay R3270 completes, at the contacts 3271, an obvious path, including the contacts 3251, for applying ground potential to the conductor C3201 extending to the register translator 1700.

The application of ground potential to the conductor C3201 extending to the register translator 1700 effects the release thereof, whereby ground potential is removed from the start conductor C3202 and battery potential is removed from the test conductor C3101 in order to effect the restoration of the start relay R3210 and the stop relay R3220 in the detector 2900. Also, in the register translator 1700, the storage relay R2850 restores in order to interrupt, at the contacts 2852, the previously traced test circuit, including the S conductor S433, extending to the line switch 423 individually associated with the private subscriber line 407, whereupon the ninth amplifier 9AMP in the detector 2900 is released in order to effect the restoration of the ninth test stop relay 9R, in an obvious manner. Also the register translator 1700 interrupts the application of ground potential to the hold conductor C3401 extending to the detector 2900.

Continuing now with the release of the detector 2900, when ground potential is removed from the start conductor C3202, the start relay R3210 restores; thereby to interrupt, at the contacts 3212, the previously traced holding circuit for energizing the winding of the cycle relay FD in series with the winding of the finder relay 6F, thereby to cause the latter relays to restore. Upon restoring, the stop relay R3220 interrupts, at the contacts 3222, the previously mentioned circuit for energizing the winding of the hold relay R3230; thereby to cause the latter relay to restore shortly thereafter, the hold relay R3230 being of the slow-to-release type. Upon restoring, the hold relay R3230 interrupts, at the contacts 3232, the previously traced holding circuit for energizing in series the windings of the control relays R3270 and R3260 and the previously traced multiple holding circuit for energizing in series the windings of the control relays R3280 and R3310, thereby to cause the relays mentioned to restore. Also the hold relay R3230 interrupts, at the contacts 3233, the previously traced holding circuit for energizing the winding of the test relay R3240 in series with the right-hand winding of the tenth test lock relay 0S and the previously traced multiple holding circuit for energizing the winding of the test relay R3250 in series with the right-hand winding of the ninth test mark relay 9T, thereby to cause the relays mentioned to restore. Upon restoring, the control relay R3270 interrupts, at the contacts 3271, the previously mentioned path for applying ground potential to the conductor C3201 extending to the register translator 1700; and, upon restoring, the control relay R3280 interrupts, at the contacts 3283, the previously traced circuit for energizing the winding of the mark relay R3290, thereby to cause the latter relay to restore. Also at this time, the pulse relay R3315 occupies its restored position, whereupon the pulse relay R3320 is restored in order to effect the restoration of the pulse control relays R3330 and R3335. Upon restoring, the test relay R3240 interrupts, at the contacts 3241, the previously traced circuit for energizing the winding of the switch relay R3710, thereby to cause the latter relay to restore; and, upon restoring, the control relay R3280 interrupts, at the contacts 3282, the previously traced circuit for energizing the winding of the switch relay R3810, thereby to cause the latter relay to restore. Upon restoring, the tenth test lock relay 0S interrupts, at the contacts 0S5, the previously traced holding circuit for energizing the winding of the tenth A relay 00A, thereby to cause the latter relay to restore; and interrupts, at the contacts 0S4, the previously traced holding circuit for energizing the winding of the tenth D relay 0D, thereby to cause the latter relay to restore. Finally, when the ninth step relay 9K restores it interrupts, at the contacts 9K1, the previously traced circuit for energizing the winding of the ninth E relay 9E, thereby to cause the latter relay to restore. At this time the detector 2900 is completely released and available for further use.

In view of the foregoing explanation of the mode of operation of the detector 2900, it will be understood that it operated to detect the numerical portion of the directory number of the private subscriber line 407 extending to the calling private subscriber substation TP and effected the registration of the detected numerical portion of the directory number mentioned in the four corresponding code storage devices in the register translator 1700. More particularly, at this time, the four digits 0, 0, 9 and 9 representing the numerical portion of the directory number of the private subscriber line 407 are respectively registered in the code storage devices mentioned in the register translator 1700.

In view of the foregoing explanation of the mode of operation of the detector 2900 to detect a numerical portion of the directory number of the calling subscriber line 407, it will be understood that the step relays 0K and 9K, inclusive, are operated through a first cycle, to detect the thousand digit of the directory number in conjunction with the amplifiers 0AMP to 9AMP, inclusive, to detect the hundred digit of the directory number; then the step relays 0K to 9K, inclusive, are operated through a second cycle, to detect the ten digit of the directory number in conjunction with the amplifiers 0AMP to 9AMP, inclusive, to detect the unit digit of the directory number. During either the first test or the second test of the step relays 0K to 9K, inclusive, should these relays operate through a first complete cycle and fail to make a detection in the manner explained above, a second cycle of operation thereof would be initiated, as will be explained hereinafter.

At the beginning of the second cycle of operation of the step relays 0K to 9K, inclusive, the first step relay 1K would operate while the tenth step relay 0K and the cycle relay KD occupy their operated positions. In this event, upon operating, the first step relay 1K completes, at the contacts 1K7, an obvious circuit, including the contacts KD6 and 3346, for energizing the winding of the first test relay R3340, thereby to cause the latter relay to operate. Upon operating, the first test relay R3340 completes, at the contacts 3341, an obvious path, including the grounded hold conductor C3364, for short-circuiting the winding of the lock relay R3345. During this second cycle of operation of the step relays 0K to 9K, inclusive, when the cycle relay KD restores it interrupts, at the contacts KD6, the above-traced original operating circuit for energizing the winding of the first test relay R3340; whereupon a series circuit, including the grounded hold conductor C3364 and the contacts 3341, is completed for energizing the winding of the lock relay R3345 in series with the winding of the first test relay R3340. When this series circuit is completed the first test relay R3340 is retained in its operated position and the lock relay R3345 operates. Upon operating, the lock relay R3345 interrupts, at the contacts 3346, a further point in the previously traced circuit for energizing the winding of the first test relay R3340; and prepares, at the contacts 3347, a point in a circuit traced hereinafter for energizing the winding of the second test relay R3350.

During the second cycle of operation mentioned of the step relays 0K to 9K, inclusive, in the event a detection is made, the control relay R3270 operates in order to interrupt, at the contacts 3275, the previously traced path for applying ground potential to the hold conductor C3364, as previously explained; whereby the previously traced holding circuit for energizing the winding of the lock relay R3345 in series with the winding of the first test relay R3340 is interrupted in order to cause the latter relays to restore; and the step relays 0K to 9K, inclusive, and the cycle relays KA, KB etc. are restored, all in the manner previously explained. On the other hand, in the event no detection is made during the second cycle of operation mentioned of the step relays 0K to 9K, inclusive, a third cycle of operation thereof is initiated, as previously explained.

At the beginning of the third cycle of operation of the step relays 0K to 9K, inclusive, the first step relay 1K operates while the tenth step relay 0K and the cycle relay KD occupy their operated positions. In this event, upon operating, the first step relay 1K completes, at the contacts 1K7, the previously mentioned circuit, including the contacts KD6 and 3347, for energizing the winding of the second test relay R3350. When thus energized the second test relay R3350 operates to complete, at the contacts 3354, an obvious holding circuit, including the grounded hold conductor C3364 for energizing the winding thereof. Also the second test relay R3350 completes, at the contacts 3353, an obvious circuit for energizing the winding of the alarm relay R3360; thereby to cause the latter relay to operate and complete, at the contacts 3361, an obvious holding circuit, including the reset key K3370, for energizing the winding thereof. Also the alarm relay R3360 completes, at the contacts 3362, an obvious circuit for operating the alarm A3375, thereby to indicate to the exchange attendant that the detector 2900 has operated and failed to detect a directory number. Further the second test relay R3350 interrupts, at the contacts 3352, the previously traced circuit for energizing in multiple the upper and lower windings of the pulse relay R3315, thereby to arrest further operation of the latter relay at this time. Finally the second test relay R3350 completes, at the contacts 3351, an obvious path for applying ground potential to the conductor C3301 extending to the register translator 1700.

The application of ground potential to the conductor C3301 extending to the register translator 1700 causes the register translator 1700 to register the failure of the detector 2900, whereby ground potential is removed from the start conductor C3202 and battery potential is removed from the test conductor C3101 in order to effect the restoration of the start relay R3210 and the stop relay R3220 in the detector 2900 and the consequent release of the detector 2900, in the manner previously explained.

The exchange attendant may replace the detector 2900 again in series by momentarily operating the reset key K3370; thereby to interrupt the previously mentioned holding circuit for energizing the winding of the alarm relay R3360 in order to cause the latter relay to restore. Upon restoring, the alarm relay R3360 interrupts, at the contacts 3361, a further point in the previously traced holding circuit for energizing the winding thereof; and interrupts, at the contacts 3362, the previously mentioned circuit for operating the alarm A3375.

In view of the foregoing explanation of the mode of operation of the detector 2900 to detect the directory number of the calling private subscriber substation TP connected to the called private subscriber line 407 as 0099, it will be understood that the detector 2900 is operative in a substantially identical manner to detect the directory number of any called subscriber substation in exchange 4 zone 84. For example, the detector 2900 is operative to detect the directory numbers of the calling party subscriber substations TS1, TS2, TS3 and TS4 connected to the party subscriber line 410 as 0100, 0200, 0300 and 0400. By way of illustration, it is pointed out that, when the calling fourth party subscriber substation TS4 initiates a metropolitan toll call, the register translator 1700 operates to cause ground potential to be applied to the fourth hold conductor C3404, whereby only the fourth A relay 04A in the tenth group of A relays operates incident to the operation of the tenth B relay 0B in the detector 2900. The operation of the fourth A relay 04A in the tenth group of A relays connects the S conductor S434 extending to the line switch 423 individual to the party subscriber line 410 to the fourth group of 100 test conductors, whereby the fourth amplifier 4AMP is operated in conjunction with the tenth step relay 0K in order to arrest the first test cycle of operation of the detector 2900, thereby to identify the thousand digit and the hundred digit of the calling party subscriber substation TS4, respectively, as 0 and 4. The subsequent operation of the detector 2900 to detect the ten and unit digit of the directory number of the calling party subscriber substation TS4 as 0 and 0 is the same as that previously described; whereby the complete directory number of the calling party subscriber substation TS4 is detected as 0400.

*Detailed operation of the tenth amplifier 0AMP*

Considering now in greater detail the operation of the tenth amplifier 0AMP illustrated, it is noted that this amplifier constitutes one of ten amplifiers or detector units. In the amplifier or detecting unit 0AMP, the cathode 421 of the driver tube 420 is heated by an associated heater provided with a normally completed circuit, including the resistors 424 and 427, whereby the cathode 421 is rendered electron emissive. The plate 425 of the driver tube 420 is connected by way of the primary winding 431 of the coupling transformer 430 to ground potential which is the grounded positive terminal of the exchange battery; the cathode 421 being connected by way of the resistor 427 to battery potential which is the negative terminal of the exchange battery. The screen grid 423 of the driver tube 420 is connected directly to ground potential; while the control grid 422 of the driver tube 420 is connected by way of the secondary winding 401 of the coupling transformer 400 to battery potential. Accordingly, the control grid 422 is normally biased to a negative potential with respect to the cathode 421 by an amount equal to the voltage drop across the cathode biasing resistor 427, which is voltage sufficient to bias the driver tube 420 to approximately the mid-point of the linear portion of its operating characteristic.

When the operation of the detector 2900 is initiated, the tone generator 3160 operates to supply 2000 cycle alternating current to the primary winding 411 of the coupling transformer 410, as previously noted; whereby 2000 cycle alternating current traverses the secondary winding 413 of the coupling transformer 410, the conductors C414 and C415 and the primary winding 406 of the coupling transformer 405 in the amplifier 0AMP. The 2000 cycle alternating current traversing the primary winding 406 of the coupling transformer 405 induces a corresponding alternating voltage in the secondary winding 407 thereof. One terminal of the secondary winding 407 of the coupling transformer 405 is connected to the mid point between the resistors R1 and R2 and to the mid point between the condensers C1 and C2; while the other terminal of the secondary winding 407 of the coupling transformer 405 is connected directly to the plate 442 of the rectifier tube 440 and via the secondary winding 432 of the coupling transformer 430 to the plate 445 of the rectifier tube 440. As previously noted, the resistor R1 and the condenser C1 are connected in parallel, and the resistor R2 and the condenser C2 are connected in parallel to form a bridge circuit, one terminal of this bridge circuit being common to the resistor R1 and the condenser C1 and being connected to the cathode 444 of the rectifier tube 440, and the other terminal of this bridge circuit being common to the resistor R2 and the condenser C2 and being connected to the cathode 441 of the rectifier tube 440. The cathode heaters 443 and 446 of the respective cathodes 441 and 444 of the rectifier tube 440 are included in a normally completed series circuit, including the resistors 447 and 448, and the cathode heater associated with the cathode 454 of the amplifier tube 450, whereby the cathodes 441 and 444 of the rectifier tube 440 and the cathode 454 of the amplifier tube 450 are rendered electron emissive.

Accordingly, the rectifier tube 440 is rendered conductive and current flows through both of the space current paths therein. More particularly, on each half cycle of the alternating voltage induced in the secondary winding 407 of the coupling transformer 405, current flows from the positive terminal of the secondary winding 407 by way of the space current path between the plate 442 and the cathode 441 of the rectifier tube 440 and the resistor R2 to the negative terminal of the secondary winding 407, and from the positive terminal of the secondary winding 407 by way of the secondary winding 432 of the coupling transformer 430, the space current path between the plate 445 and the cathode 444 of the rectifier tube 440 and the resistor R1 to the negative terminal of the secondary winding 407. Accordingly, the alternating voltage induced in the secondary winding 407 of the coupling transformer 405 causes rectified current to traverse the two multiple space current paths through the rectifier tube 440, which respectively include the resistors R2 and R1. At this point it is noted that the resistance values of the resistors R1 and R2 are substantially equal and are exceedingly high with respect to the impedance value of the secondary winding 432 of the coupling transformer 430, whereby the currents traversing the two parallel paths respectively including the two resistors R2 and R1 are substantially equal. Hence the voltage drop across the resistor R1 is substantially equal to the voltage drop across the resistor R2, these voltage drops being in opposite directions due to the flow of current in the two multiple paths through the two respective resistors R1 and R2 to the negative terminal of the secondary winding 407 of the coupling transformer 405. Accordingly, it will be understood that the condenser C1 bridged across the resistor R1 and the condenser C2 bridged across the resistor R2 are charged to two substantially equal and opposite voltages.

In the amplifier tube 450, the cathode 454 is connected via the resistor 448 to battery potential and the plate 451 is connected via the winding of the tenth test stop relay 0R to ground potential. Also the screen grid 452 of the amplifier tube 450 is connected directly to ground potential while the control grid 453 of the amplifier tube 450 is connected by way of the resistor 449 and the condensers C1 and C2 in series to battery potential. Accordingly, the control grid 453 is biased to a negative potential with respect to the cathode 454 due to the provision of the cathode biasing resistor 448, whereby the amplifier tube 450 is normally rendered substantially nonconductive. More particularly, it is noted that, in the amplifier tube 450, the control grid 453 is normally biased approximately six volts negative with respect to the cathode 454 due to the provision of the cathode biasing resistor 448 included in the connection between the cathode 454 and battery potential. This bias of the control grid 453 with respect to the cathode 454 of the amplifier tube 450 is normally maintained due to the fact that equal and opposite voltages normally appear across the condensers C1 and C2 when the two parallel paths through the rectifier tube 440 conduct equal currents, as previously noted.

Accordingly, when operation of the detector 2900 is initiated, operation of the various amplifiers, including the tenth amplifier 0AMP, is initiated; whereby, in the tenth amplifier 0AMP, the rectifier tube 440 and the driver tube 420 are rendered conductive and the amplifier tube 450 is rendered substantially nonconductive. Hence, the tenth test stop relay 0R remains in its restored position. Also the 2000 cycle alternating voltage induced in the secondary winding 412 of the coupling transformer 410 is impressed upon the conductor C3102 for the purpose previously noted.

During operation of the detector 2900, when the one of the ten B relays, corresponding to the thousand terminal group including the calling terminal, operates, one of the ten amplifiers, corresponding to the hundred line group including the calling terminal, operates. For example, assuming that a call is initiated at the calling subscriber substation TP and that the detector 2900 is operating to detect the directory number thereof, in the manner previously explained, when the tenth B relay 0B operates, the tenth A relay 00A in the associated group operates to complete the previously traced connection between the conductor C3102 and the primary winding 402 of the coupling transformer 400 in the tenth amplifier 0AMP. The above-mentioned circuit extends, when completed, from one terminal of the secondary winding 412 of the coupling transformer 410 by way of C3102, the contacts 2852, C1393, C645, the control conductor of the trunk 462, S433, the contacts of the tenth A relay 00A in the tenth group, the contacts of the tenth C relay 0C, the tenth test conductor C3500, the primary winding 402 of the coupling transformer 400 and the connected multiple resistor 403 in the tenth amplifier 0AMP to ground potential, the other terminal of the secondary winding 412 of the coupling transformer 410 being connected to ground potential. When the above-traced series circuit is completed, 2000 cycle alternating current from the secondary winding 412 of the coupling transformer 410 traverses the primary winding 402 of the coupling transformer 400, is amplified through the driver tube 420, and appears as an induced voltage in the secondary winding 432 of the coupling transformer 430. In this regard it is noted that the phase shift produced between the voltage across the secondary winding 412 and the voltage across the primary winding 402 by the shunt and series impedance of the above-traced signaling circuit, is substantially negligible. Accordingly, the voltage induced in the secondary winding 432 from the primary winding 431 is substantially in phase with the voltage applied to the plate 445 of the rectifier tube 440 from the secondary winding 407 of the coupling transformer 405. Hence, it will be understood that the voltage between the plate 445 and the cathode 444 of the rectifier tube 440 is considerably increased while the voltage between the plate 442 and the cathode 441 of the rectifier tube 440 is not materially affected. Accordingly, the current traversing the first space current path through the rectifier tube 440, including the resistor R1 in the bridge circuit, is substantially greater than the current traversing the second space current path through the rectifier tube 440, including the resistor R2 in the bridge circuit. Hence, the voltage drop across the resistor R1 will be considerably greater than that across the resistor R2 in the bridge circuit. Thus, the bridge circuit is unbalanced, causing the condenser C1 to be charged to a greater voltage than the condenser C2.

After a predetermined number of cycles of alternating current from the tone generator 3160 have been received by the tenth amplifier 0AMP, the charge upon the condenser C1 will be built up considerably more than the charge upon the condenser C2, whereby the voltage across the condenser C1 will considerably predominate over the voltage across the condenser C2, the predominant voltage across the condenser C1 rendering the control grid 453 less negative with respect to the cathode 454 of the amplifier tube 450. At this time, the amplifier tube 450 is rendered conductive, whereby the winding of the tenth test stop relay 0R is sufficiently energized to cause operation thereof. Upon operating, the tenth test stop relay 0R causes the first test cycle of the detector 2900 to be arrested in the manner previously explained. The circuit for energizing the winding of the test stop relay 0R extends from ground potential by way of the winding of 0R, the plate 451 and the cathode 454 of the amplifier 450 and the resistor 448 to battery potential.

At the conclusion of the first cycle of operation of the detector 2900, each of the ten C relays 0C to 9C, inclusive, restores, thereby to interrupt the previously traced circuit for energizing the primary winding 402 of the coupling transformer 400 with alternating current from the secondary winding 412 of the coupling transformer 410, as previously explained. When the primary winding 402 of the coupling transformer 400 is thus deenergized, the voltage impressed between the plate 445 and the cathode 444 is rendered substantially equal to that impressed between the plate 442 and the cathode 441, whereby the current traversing the two space current paths through the rectifier tube 440 is again balanced, causing equal currents to traverse the resistors R1 and R2. At this time, substantially equal and opposite voltages again appear across the condensers C1 and C2, whereby the control grid 453 of the amplifier tube 450 is again biased sufficiently negative with respect to the cathode 454 to effect the restoration of the tenth test stop relay 0R.

In view of the foregoing explanation of the mode of operation of the tenth amplifier or detector unit 0AMP in the detector 2900, it will be understood that this unit is effective to match the alternating voltage received directly from the tone generator 3160 via the coupling transformers 410 and 405 with the alternating voltage received over the S lead associated with the line switch individually associated with the calling subscriber, substation due to the switching operation of the various B relays in the associated group. Hence, it will be understood that, when the appropriate B relay in the detector 2900 operates to connect the S lead associated with the line switch individual to the calling subscriber line to the tenth amplifier 0AMP, which S lead has impressed thereon the 2000 cycle voltage via the secondary winding 412 of the coupling transformer 410, the tenth amplifier 0AMP operates immediately, as described above. However, the tenth amplifier 0AMP will not operate in the manner described above in the event a stray alternating voltage, which differs even slightly in frequency from 2000 cycles per second, is impressed upon the connected S lead, due to the failure of the stray alternating voltage impressed upon the connected S lead to match the 2000 cycle voltage connected to the tenth amplifier 0AMP via the coupling transformers 410 and 405 from the tone generator 3160. In fact, the tenth amplifier 0AMP may be rendered frequency selective within + or − ten cycles of the frequency of the alternating voltage established by the tone generator 3160 by utilizing the arrangement disclosed, wherein the resistors R1 and R2 have a resistance of approximately 300,000 ohms and the condensers C1 and C2 have a capacity of approximately 0.1 mf.

This selectivity of the tenth amplifier 0AMP to the frequency of the alternating voltage produced by the tone generator 3160 will be understood when it is considered that any stray surge voltage appearing upon the connected S lead will be of an extremely short time duration. When the voltage impressed between the plate 445 and the cathode 444 is thus increased with respect to the voltage impressed between the plate 442 and the cathode 441 of the rectifier tube 440 for the short time duration mentioned, a greater current flows via the current path, including the resistor R1, than via the current path, including the resistor R2. However, the increased current traversing the resistor R1 with respect to the current traversing the resistor R2 persists only for the short time interval mentioned; and, in view of the large capacitance of the condenser C1, the charge accumulated thereon will not increase the voltage thereacross appreciably during this short time interval. Hence, the bias of the control grid 453 with respect to the cathode 454 of the amplifier tube 450 will not be sufficiently affected to render the amplifier tube 450 conductive. Moreover, even though the amplifier tube 450 were rendered conductive for an extremely short interval of time, the winding of the tenth test stop relay 0R would not be sufficiently saturated to cause the latter relay to operate. Furthermore, in order positively to prevent false operation of the tenth amplifier 0AMP, the transformation ratio between the primary and secondary windings of the coupling transformer 405 is selected with reference to the transformation ratio between the primary and secondary windings of the coupling transformer 430 and the amplifying factor of the driver tube 420 with respect to possible external voltage surges impressed upon the primary winding 402 of the coupling transformer 400; such that the reference voltage impressed between the plate 445 and the cathode 444 of the rectifier tube 440 by the secondary winding 407 of the coupling transformer 405 is relatively high with respect to any possible amplified signal voltage which may be induced in the secondary winding 432 of the coupling transformer 430.

On the other hand, in the event the S lead connected to the tenth amplifier 0AMP had a sustained alternating voltage thereon of a frequency reasonably different from the 2000 cycle alternating voltage generated by the tone generator 3160, the amplified signal current traversing the primary winding 431 of the coupling transformer 430 would be of a periodicity considerably different from the alternating voltage applied to the secondary winding 432 of the coupling transformer 430 via the coupling transformer 405 in the associated bridge circuit; whereby the periodicities of the two voltages would beat at a relatively high beat frequency.

In this case, when the amplified signal current induced in the secondary winding 432 beats substantially in phase with the 2000 cycle reference current traversing this secondary winding of the coupling transformer 430, the current traversing the path including the resistor R1 would be increased in order to cause the condenser C1 gradually to accumulate a charge greater than that accumulated by the condenser C2. However, before the voltage appearing across the condenser C1 predominates over the voltage appearing across the condenser C2 sufficiently to alter the bias applied to the control grid 453 with respect to the cathode 454 of the amplifier tube 450 in order to render the amplifier tube 450 appreciably more conductive, the amplified periodic signal voltage and the 2000 cycle reference voltage will not be beating substantially in phase. Hence, at this time, the current traversing the current path including the resistor R1 is again decreased toward that of the current traversing the current path including the resistor R2, whereby the voltage impressed across the condenser C1 is lowered toward that impressed across the condenser C2 in order again to maintain the negative bias of the control grid 453 with respect to the cathode 454 of the amplifier tube 450 in order to render the amplifier tube 450 less conductive before the tenth test stop relay 0R has operated.

Also, in this case, when the amplified signal current induced in the secondary winding 432 beats substantially entirely out of phase with the 2000 cycle reference current traversing this secondary winding of the coupling transformer 430, the current traversing the path, including the resistor R1, would be decreased in order to cause the condenser C1 gradually to accumulate a charge less than that accumulated by the condenser C2. Accordingly, the voltage impressed across the condenser C2 predominates over the voltage impressed across the condenser C1, whereby the control grid 453 is rendered more negative with respect to the cathode 455 in order to render the amplifier tube 450 even less conductive.

In view of the above explanation of the mode of operation of the tenth amplifier 0AMP, it will be readily appreciated that it is extremely selective to frequency and phase variations in matching the found signal voltage with the reference voltage received directly from the tone generator 3160. However, it is noted that the frequency of the alternating current produced by the tone generator 3160 may vary throughout a wide range affecting the selectivity of the tenth amplifier 0AMP in view of the fact that whatever alternating voltage is generated by the tone generator 3160 is applied as a reference voltage directly to the tenth amplifier 0AMP as a standard of comparison which is matched against the detected signal voltage; which detected signal voltage will closely match the reference voltage applied directly to the amplifier 0AMP when the detector 2900 has operated to detect the S lead extending to the line switch individually associated with the calling subscriber line, which S lead has impressed thereon the signal voltage from the tone generator 3160 at this time.

Conclusions

In view of the foregoing, it is apparent that a telephone system is provided which comprises a detector operative to detect the directory number of a terminal individual to a calling subscriber substation; which detector incorporates a number of improved amplifier or detector units which are operative to perform the detection mentioned; wherein each of the detector units utilizes an improved arrangement for matching a given signal voltage applied to the calling terminal against a corresponding given reference voltage applied directly to the detector unit.

While one embodiment of the invention has been disclosed, it will be understood that various modifications may be made therein which are within the true spirit and scope of the invention.

What is claimed is:

1. In a telephone system including a plurality of lines, means for impressing a signal voltage upon any one of said lines having a predetermined condition thereon, a matching device, means for impressing a reference voltage upon said matching device, means for progressively connecting different ones of said lines to said matching device to test for and find a line impressed with said signal voltage, whereby said signal voltage is impressed upon said matching device when said one line is connected thereto, and means controlled by said matching device when a signal voltage impressed thereupon bears a fixed relation to said reference voltage impressed thereupon for detecting the corresponding one of said lines connected thereto.

2. In a telephone system including a plurality of lines, each of said lines having an arbitrary identification character individual thereto, means for impressing a signal voltage upon any one of said lines having a predetermined condition thereon, a matching device for determining which line is impressed with said signal voltage, means for impressing a reference voltage upon said matching device, means for progressively connecting different ones of said lines to said matching device to test for a line impressed with said signal voltage, whereby said signal voltage is impressed upon said matching device when said one line is connected thereto, and means controlled by said matching device when a signal voltage impressed thereupon bears a fixed relation to said reference voltage impressed thereupon for detecting the arbitrary identification character individual to the corresponding one of said lines connected thereto.

3. In a telephone system including a plurality of lines, each of said lines being assigned a directory number individual thereto, means for impressing a signal voltage upon any one of said lines having a predetermined condition thereon, a matching device, means for impressing a reference voltage upon said matching device, means for progressively connecting different ones of said lines to said matching device to test for and find a line impressed with a signal voltage, whereby said signal voltage is impressed upon said matching device only when said one line is connected thereto, and means controlled by said matching device when a signal voltage impressed thereupon bears a fixed relation to said reference voltage impressed thereupon for detecting the directory number assigned to the corresponding one of said lines connected thereto.

4. In a telephone system including a plurality of terminals; a detector comprising a generator operative to generate a voltage, a matching device, means for impressing said voltage as a reference voltage upon said matching device, means for selectively connecting said voltage to any one of said terminals, progressively operated testing means for selectively connecting different ones of said terminals to said matching device when any one terminal is impressed with said voltage, whereby said voltage is impressed as a signal voltage upon said matching device only when said one terminal is connected thereto, and means controlled by said matching device when a signal voltage impressed thereupon bears a fixed relation to said reference voltage impressed thereupon for detecting said one terminal.

5. In a telephone system including a plurality of terminals; a detector comprising a generator operative to generate a voltage, a matching device, means for impressing said voltage as a reference voltage upon said matching device, means for selectively connecting said voltage to any one of said terminals, switching apparatus operative through a cycle progressively to connect different ones of said terminals to said matching device, whereby said voltage connected to said one terminal is impressed as a signal voltage upon said matching device only when said one terminal is connected thereto by said switching apparatus, means controlled by said matching device when a signal voltage impressed thereupon bears a fixed relation to said reference voltage impressed thereupon for arresting operation of said switching apparatus, and means controlled by the particular arrested position of said switching apparatus in its cycle for detecting said one terminal.

6. In a telephone system including a plurality of terminals; a detector comprising a generator operative to generate a voltage, a plurality of matching devices, means for impressing said voltage as a reference voltage upon each of said matching devices, means for selectively connecting said voltage to any one of said terminals, means operated through a cycle for progressively connecting different ones of said terminals to corresponding ones of said matching devices, whereby said voltage connected to said one terminal is impressed as a signal voltage upon the one of said matching devices to which said one terminal is connected by said progressively operated means, and means controlled by any one of said matching devices when a signal voltage impressed thereupon bears a fixed relation to said reference voltage impressed thereupon for detecting said one terminal.

7. In a telephone system including a plurality of terminals; a detector comprising a generator operative to generate a voltage, a plurality of matching devices, means for impressing said voltage as a reference voltage upon each of said matching devices, means for selectively connecting said voltage to any one of said terminals, switching apparatus operative through a cycle progressively to connect different ones of said terminals to different ones of said matching devices, whereby said voltage is impressed as a signal voltage upon the one of said matching devices to which said one terminal is connected, means controlled by any one of said matching devices when a signal voltage impressed thereupon bears a fixed relation to said reference voltage impressed thereupon for arresting operation of said switching apparatus, and means controlled jointly by the particular arrested position of said switching apparatus in its cycle and the particular one of said matching devices which arrested operation of said switching apparatus for detecting said one terminal.

8. In a telephone system including a plurality of terminals; a generator operative to generate an alternating voltage, a matching device, means for impressing said alternating voltage as a reference voltage upon said matching device, means for selectively connecting said alternating voltage to any one of said terminals, means for progressively connecting different ones of said terminals to said matching device to test for and find said voltage connected to said one terminal, whereby said alternating voltage is impressed as a signal voltage upon said matching device only when said one terminal is connected thereto, and means controlled by said matching device when the frequency of a signal voltage impressed thereupon bears a fixed relation to the frequency of said reference voltage impressed thereupon for detecting said one terminal.

9. In a telephone system including a plurality of terminals; a generator operative to generate an alternating voltage, a matching device, means for impressing said alternating voltage as a reference voltage upon said matching device, means for selectively connecting said alternating voltage to any one of said terminals, means for progressively connecting different ones of said terminals to said matching device to test for and find said voltage connected to said one terminal, whereby said alternating voltage is impressed as a signal voltage upon said matching device when said one terminal is connected thereto by said last mentioned means, and means controlled by said matching device when both the frequency and phase of a signal voltage impressed thereupon bear a fixed relation to the respective frequency and phase of said reference voltage impressed thereupon for detecting said one terminal.

10. Line detecting apparatus having access to a plurality of lines and comprising electron discharge means including two space current paths, two circuits respectively including said two space current paths and a common source of reference voltage, means for locating one of said lines to be detected, means controlled by said locating means for impressing a signal voltage on one of said circuits, whereby the relative magnitudes of the currents traversing said two circuits are changed, and detecting means controlled in accordance with the relative magnitudes of the currents traversing said circuits.

11. Line detecting apparatus having access to a plurality of lines and comprising electron discharge means including two space current paths, two circuits respectively including said two space current paths and a common source of reference voltage, whereby substantially balanced currents traverse said two circuits, means for locating one of said lines to be detected, means controlled by said locating means for impressing a signal voltage on one of said circuits, whereby the currents traversing said two circuits are unbalanced, and detecting means controlled in response to a predetermined unbalance of the currents traversing said two circuits.

12. Line detecting apparatus having access to a plurality of lines and comprising electron discharge means including two space current paths, two circuits respectively including said two space current paths and a common source of alternating reference voltage, whereby substantially balanced currents traverse said two circuits, means for locating one of said lines to be detected, means controlled by said locating means for impressing an alternating signal voltage on one of said circuits, whereby the currents traversing said two circuits are unbalanced, and detecting means controlled in response to an unbalance of the currents traversing said two circuits in a predetermined direction for a predetermined time duration, whereby said detecting means is controlled only in the event said signal voltage is of substantially the same frequency of said reference voltage.

13. Line detecting apparatus having access to a plurality of lines and comprising electron discharge means including two space current paths, two circuits respectively including said two space current paths and a common source of alternating reference voltage, whereby substantially balanced currents traverse said two circuits, means for locating one of said lines to be detected, means controlled by said locating means for impressing an alternating signal voltage on one of said circuits, whereby the currents traversing said two circuits are unbalanced, and detecting means controlled in response to an unbalance of the currents traversing said two circuits in a predetermined direction for a predetermined time duration, whereby said detecting means is controlled only in the event said signal voltage is of substantially the same frequency and phase of said reference voltage.

14. Line detecting apparatus associated with a plurality of lines and comprising electron discharge means including two space current paths, two impedance elements, two circuits respectively including said two space current paths and said two impedance elements and a common source of alternating reference voltage, means for locating one of said lines to be detected, means controlled by said locating means for impressing an alternating signal voltage on one of said circuits, whereby the relative magnitudes of the currents traversing said two circuits are changed, two condensers respectively bridging said two impedance elements, whereby each condenser is charged in accordance with the voltage drop across the bridged impedance element, and detecting means controlled in accordance with the relative voltages to which said two condensers are charged.

15. Line detecting apparatus associated with a plurality of lines and comprising electron discharge means including two space current paths, two impedance elements, two circuits respectively including said two space current paths and said two impedance elements and a common source of alternating reference voltage, means for locating one of said lines to be detected, means controlled by said locating means for impressing an alterating signal voltage on one of said circuits, whereby the relative magnitudes of the currents traversing said two circuits are changed, two condensers respectively bridging said two impedance elements, whereby each condenser is charged in accordance with the voltage drop across the bridged impedance element, an amplifier tube provided with a space current path and a control grid, a control circuit for varying the bias applied to said control grid in accordance with the relative voltages to which said two condensers are charged, whereby the current traversing the space current path of said amplifier tube may be controlled, and detecting means controlled by the current traversing the space current path of said amplifier tube.

OTHO D. GRANDSTAFF.